United States Patent
Endoh et al.

(10) Patent No.: US 9,003,817 B2
(45) Date of Patent: Apr. 14, 2015

(54) AIR-CONDITIONING HOT-WATER SUPPLY SYSTEM, AND HEAT PUMP UNIT

(75) Inventors: Kazuhiro Endoh, Kasumigaura (JP); Tatsuo Fujii, Mito (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 13/389,024

(22) PCT Filed: Feb. 25, 2010

(86) PCT No.: PCT/JP2010/052985
§ 371 (c)(1), (2), (4) Date: Mar. 5, 2012

(87) PCT Pub. No.: WO2011/036905
PCT Pub. Date: Mar. 31, 2011

(65) Prior Publication Data
US 2012/0180508 A1    Jul. 19, 2012

(30) Foreign Application Priority Data
Sep. 25, 2009   (JP) .................................. 2009-219895

(51) Int. Cl.
*F25B 7/00*   (2006.01)
*F25B 29/00*   (2006.01)
(Continued)

(52) U.S. Cl.
CPC .......... *F25B 29/003* (2013.01); *F24D 11/0221* (2013.01); *F24F 3/06* (2013.01);
(Continued)

(58) Field of Classification Search
CPC .......... F24D 17/02; F24F 5/00; F24F 5/0003; F24F 5/0096; F24H 4/00; F24H 4/02
USPC ............... 62/79, 159, 160, 175, 238.6, 238.7, 62/324.1, 324.6, 335; 237/2 B
See application file for complete search history.

(56) References Cited

U.S. PATENT DOCUMENTS 6,662,864 B2 *   12/2003   Burk et al. ..................... 165/202
7,234,646 B2 *   6/2007   Saitoh et al. ................... 237/2 B
(Continued)

FOREIGN PATENT DOCUMENTS

JP    4-32669    2/1992
JP    5-5567    1/1993
(Continued)

OTHER PUBLICATIONS

Japanese office action of Appln. No. 2009-219895 dated Jan. 22, 2013.

*Primary Examiner* — Jonathan Bradford
(74) *Attorney, Agent, or Firm* — Baker Botts L.L.P.

(57) ABSTRACT

A discharged warm/cold heat of a refrigerant circuit is effectively utilized in order to attain high energy efficiency. Appropriate operation control is executed when a hot-water supplying operation and an air cooling operation are simultaneously performed, whereby high energy efficiency is attained.
When an air cooling operation by an air temperature adjusting refrigerant circuit and a hot-water supplying operation by a hot-water supplying refrigerant circuit are executed, the air temperature adjusting refrigerant circuit, and the hot-water supplying refrigerant circuit are controlled such that a target evaporation temperature of the hot-water supplying refrigerant circuit or a target condensation temperature of the air temperature adjusting refrigerant circuit is attained, the target evaporation temperature or the target condensation temperature being set based upon an air cooling capacity and an evaporation temperature of the air temperature adjusting refrigerant circuit and a hot-water supplying capacity and a condensation temperature of the hot-water supplying refrigerant circuit.

6 Claims, 17 Drawing Sheets

(51) Int. Cl.
*F24D 11/02* (2006.01)
*F24F 3/06* (2006.01)
*F24D 17/00* (2006.01)
*F24D 17/02* (2006.01)
*F25B 13/00* (2006.01)

(52) U.S. Cl.
CPC .............. *F25B 7/00* (2013.01); *F24D 17/0021* (2013.01); *F24D 17/02* (2013.01); *F25B 13/00* (2013.01); *Y02B 10/20* (2013.01); *Y02B 10/70* (2013.01); *Y02B 30/126* (2013.01); *F25B 2339/047* (2013.01); *F25B 2600/11* (2013.01); *F25B 2600/21* (2013.01); *F24D 2200/123* (2013.01); *F24D 2200/14* (2013.01)

(56) References Cited

U.S. PATENT DOCUMENTS

2009/0199581 A1* 8/2009 Ushijima et al. ............. 62/238.7
2009/0282849 A1* 11/2009 Fujimoto et al. ............. 62/228.5

FOREIGN PATENT DOCUMENTS

JP 05-005567 1/1993
JP 2004-218943 8/2004

* cited by examiner

FIG. 2

| OPERATION MODE NO. | | ⟨1⟩ 1-0 | ⟨2⟩ 1-1 | ⟨3⟩ 2-0a | ⟨4⟩ 2-0b | ⟨5⟩ 2-1 | ⟨6⟩ 2-2 |
|---|---|---|---|---|---|---|---|
| OPERATION MODE | HOT-WATER SUPPLY | ○ | ○ | ○ | ○ | ○ | ○ |
| | HEATING | ○ | ○ | × | × | × | × |
| | COOLING | × | × | ○ | ○ | ○ | ○ |
| | HOT WATER (HEAT STORAGE TANK) | × | ○ | × | × | ○ | ○ |
| | COLD WATER (HEAT STORAGE TANK) | × | × | × | × | × | × |
| | REMARK | | | (ABSORBED HEAT IN HOT-WATER SUPPLY)>(DISCHARGED HEAT IN COOLING) | (ABSORBED HEAT IN HOT-WATER SUPPLY)=(DISCHARGED HEAT IN COOLING) | (ABSORBED HEAT IN HOT-WATER SUPPLY)>(DISCHARGED HEAT IN COOLING) | (ABSORBED HEAT IN HOT-WATER SUPPLY)<(DISCHARGED HEAT IN COOLING) |
| OPERATION OF HEAT EXCHANGER | HOT-WATER SUPPLYING REFRIGERANT CIRCUIT | UTILIZATION-SIDE HEAT EXCHANGER | ○ | ○ | ○ | ○ | ○ | ○ |
| | | AIR HEAT EXCHANGER | ○ | × | ○ | × | ○ | × |
| | | INTERMEDIATE HEAT EXCHANGER | × | ○ | ○ | ○ | ○ | ○ |
| | AIR TEMPERATURE ADJUSTING REFRIGERANT CIRCUIT | UTILIZATION-SIDE HEAT EXCHANGER | ○ | ○ | × | × | × | × |
| | | AIR HEAT EXCHANGER | × | × | ○ | ○ | × | × |
| | | INTERMEDIATE HEAT EXCHANGER | × | ○ | × | × | ○ | ○ |
| | HEAT MEDIUM CIRCUIT | | × | ○ | × | ○ | ○ | ○ |
| RELATIONSHIP OF HEAT BUDGET IN HEAT SOURCE | | | (ABSORBED HEAT IN HOT-WATER SUPPLY)+(ABSORBED HEAT IN HEATING)=(DISCHARGED HEAT BY AIR) | (ABSORBED HEAT IN HOT-WATER SUPPLY)+(ABSORBED HEAT IN HEATING)=(DISCHARGED HEAT BY HOT WATER) | (ABSORBED HEAT IN HOT-WATER SUPPLY)+(DISCHARGED HEAT IN COOLING)=(DISCHARGED HEAT BY AIR) | (ABSORBED HEAT IN HOT-WATER SUPPLY)+(ABSORBED HEAT BY AIR)=(DISCHARGED HEAT IN COOLING) | (ABSORBED HEAT IN HOT-WATER SUPPLY)+(DISCHARGED HEAT IN COOLING)=(DISCHARGED HEAT BY HOT WATER) | (ABSORBED HEAT IN HOT-WATER SUPPLY)+(ABSORBED HEAT BY COLD WATER)=(DISCHARGED HEAT IN COOLING) |

| OPERATION MODE NO. | | ⟨7⟩ 3-0 | ⟨8⟩ 3-1 | ⟨9⟩ 4-0 | ⟨10⟩ 4-1 | ⟨11⟩ 5-0 | ⟨12⟩ 5-1 |
|---|---|---|---|---|---|---|---|
| OPERATION MODE | HOT-WATER SUPPLY | × | × | × | × | × | × |
| | HEATING | ○ | ○ | ○ | ○ | × | × |
| | COOLING | × | × | × | × | ○ | ○ |
| | HOT WATER (HEAT STORAGE TANK) | × | × | × | × | × | × |
| | COLD WATER (HEAT STORAGE TANK) | × | ○ | × | ○ | × | ○ |
| | REMARK | | | | | | |
| OPERATION OF HEAT EXCHANGER | HOT-WATER SUPPLYING REFRIGERANT CIRCUIT | UTILIZATION-SIDE HEAT EXCHANGER | ○ | ○ | × | × | × | × |
| | | AIR HEAT EXCHANGER | × | × | × | × | × | × |
| | | INTERMEDIATE HEAT EXCHANGER | × | ○ | × | ○ | × | ○ |
| | AIR TEMPERATURE ADJUSTING REFRIGERANT CIRCUIT | UTILIZATION-SIDE HEAT EXCHANGER | × | × | ○ | ○ | ○ | ○ |
| | | AIR HEAT EXCHANGER | × | × | ○ | ○ | ○ | × |
| | | INTERMEDIATE HEAT EXCHANGER | × | × | × | × | × | ○ |
| | HEAT MEDIUM CIRCUIT | | × | ○ | × | ○ | × | ○ |
| RELATIONSHIP OF HEAT BUDGET IN HEAT SOURCE | | | (ABSORBED HEAT IN HOT-WATER SUPPLY)=(DISCHARGED HEAT BY AIR) | (ABSORBED HEAT IN HOT-WATER SUPPLY)=(DISCHARGED HEAT BY HOT WATER) | (ABSORBED HEAT IN HEATING)=(DISCHARGED HEAT BY AIR) | (ABSORBED HEAT IN HEATING)=(DISCHARGED HEAT BY HOT WATER) | (DISCHARGED HEAT IN COOLING)=(ABSORBED HEAT BY AIR) | (DISCHARGED HEAT IN COOLING)=(ABSORBED HEAT BY COLD WATER) |

FIG. 16

Slope A

| | EVAPORATION TEMPERATURE Tl-e OF AIR TEMPERATURE ADJUSTING REFRIGERANT CIRCUIT | | | | | | | | | | |
|---|---|---|---|---|---|---|---|---|---|---|---|
| | | <8.0 | 8.0≤ | 8.5≤ | 9.0≤ | 9.5≤ | 10.0≤ | ~ | 14.0≤ | 14.5≤ | 15.0≤ |
| CONDENSATION TEMPERATURE Th-c OF HOT-WATER SUPPLYING REFRIGERANT CIRCUIT | <63.0 | ... | ... | ... | ... | ... | ... | ... | ... | ... | ... |
| | 63.0≤ | ... | ... | ... | ... | ... | ... | ... | ... | ... | ... |
| | 63.5≤ | ... | ... | ... | ... | ... | ... | ... | ... | ... | ... |
| | 64.0≤ | ... | ... | ... | a | ... | ... | ... | ... | ... | ... |
| | 64.5≤ | ... | ... | ... | ... | ... | ... | ... | ... | ... | ... |
| | 65.0≤ | ... | ... | ... | ... | ... | ... | ... | ... | ... | ... |
| | ~ | | | | | | | | | | |
| | 74.0≤ | ... | ... | ... | ... | ... | ... | ... | ... | ... | ... |
| | 74.5≤ | ... | ... | ... | ... | ... | ... | ... | ... | ... | ... |
| | 75≤ | ... | ... | ... | ... | ... | ... | ... | ... | ... | ... |

Intercept B

| | EVAPORATION TEMPERATURE Tl-e OF AIR TEMPERATURE ADJUSTING REFRIGERANT CIRCUIT | | | | | | | | | | |
|---|---|---|---|---|---|---|---|---|---|---|---|
| | | <8.0 | 8.0≤ | 8.5≤ | 9.0≤ | 9.5≤ | 10.0≤ | ~ | 14.0≤ | 14.5≤ | 15.0≤ |
| CONDENSATION TEMPERATURE Th-c OF HOT-WATER SUPPLYING REFRIGERANT CIRCUIT | <63.0 | ... | ... | ... | ... | ... | ... | ... | ... | ... | ... |
| | 63.0≤ | ... | ... | ... | ... | ... | ... | ... | ... | ... | ... |
| | 63.5≤ | ... | ... | ... | ... | ... | ... | ... | ... | ... | ... |
| | 64.0≤ | ... | ... | ... | b | ... | ... | ... | ... | ... | ... |
| | 64.5≤ | ... | ... | ... | ... | ... | ... | ... | ... | ... | ... |
| | 65.0≤ | ... | ... | ... | ... | ... | ... | ... | ... | ... | ... |
| | ~ | | | | | | | | | | |
| | 74.0≤ | ... | ... | ... | ... | ... | ... | ... | ... | ... | ... |
| | 74.5≤ | ... | ... | ... | ... | ... | ... | ... | ... | ... | ... |
| | 75≤ | ... | ... | ... | ... | ... | ... | ... | ... | ... | ... | ically connecting a high-temperature condenser, a high-temperature evaporator, a high-temperature compressor, and a high-temperature expansion valve; a first middle-temperature cycle is formed by circularly connecting a low-stage compressor, a first control valve, a four-way valve, an intermediate condenser/evaporator, a first expansion valve, and a heat-source-side heat exchanger; and a second middle-temperature cycle is formed by connecting to a suction side of the low-stage compressor through a second control value, intermediate condenser that can exchange heat with the high-temperature evaporator, a heat-source-side heat exchanger and the four-way valve, the second middle-temperature cycle being branched between a discharge side of the low-stage compressor and the first control valve. During the simultaneous operation of a high-temperature output and a low-temperature output, the absorbed heat from the intermediate condenser/evaporator can be used as the heat source for the high-temperature cycle, so that energy-saving operation can be performed. The second control valve is fully opened, and the opening degree of the first control valve is controlled in order that the discharge pressure of the low-stage compressor becomes a set value, whereby a stable operation is possible, even if the high-temperature output load and the low-temperature output load are not balanced.

CITATION LIST

Patent Document

PATENT Document 1: Japanese Laid-open Patent Publication No. 4-32669

SUMMARY OF THE INVENTION

Technical Problem

The Patent Document 1 describes a method of controlling the discharge pressure of the low-stage compressor to be a set value when the hot-water supplying operation (high-temperature output) and the cooling operation (low-temperature output) are simultaneously performed in the air-conditioning hot-water supply system. However, the Patent Document 1 does not describe how to set the set value.

An object of the present invention is to effectively utilize a discharged warm/cold heat of a refrigerant circuit so as to attain high energy efficiency. In particular, the object of the present invention is to attain high energy efficiency by appropriately controlling an operation when a hot-water supplying operation and an air cooling operation are simultaneously performed.

Solution to Problem

In order to attain the foregoing object, the present invention includes an air temperature adjusting refrigerant circuit; a hot-water supplying refrigerant circuit; and an intermediate heat exchanger that performs a heat exchange between a refrigerant circulating in the air temperature adjusting refrigerant circuit and a refrigerant circulating in the hot-water supplying refrigerant circuit, wherein the intermediate heat exchanger functions as a condenser for the air temperature adjusting refrigerant circuit, and as an evaporator for the hot-water supplying refrigerant circuit, and when an air cooling operation by the air temperature adjusting refrigerant circuit and a hot-water supplying operation by the hot-water supplying refrigerant circuit are executed, the air temperature adjusting refrigerant circuit and the hot-water supplying refrigerant circuit are controlled such that a target evaporation temperature of the hot-water supplying refrigerant circuit or a target condensation temperature of the air temperature adjusting refrigerant circuit is attained, the target evaporation temperature or the target condensation temperature being set based upon an air cooling capacity and the evaporation temperature of the air temperature adjusting refrigerant circuit and a hot-water supplying capacity and the condensation temperature of the hot-water supplying refrigerant circuit.

Advantageous Effect of Invention

According to the present invention, high energy efficiency can be attained by effectively utilizing discharged warm/cold heat of the refrigerant circuit. Particularly, high energy efficiency can be attained by appropriately controlling the operation when the hot-water supplying operation and the air cooling operation are simultaneously performed.

BRIEF DESCRIPTION OF THE DRAWINGS

FIG. 2 is a table illustrating an operation mode according to the first embodiment of the present invention.

FIG. 16 is a table for setting a slope A and an intercept B of a primary expression according to the first embodiment of the present invention.

DESCRIPTION OF EMBODIMENTS

An embodiment of the present invention will be described below.

Embodiment 1

One embodiment of an air-conditioning hot-water supply system and a heat pump unit according to the present invention will be described with reference to FIGS. 1 to 14.

Figure 1:
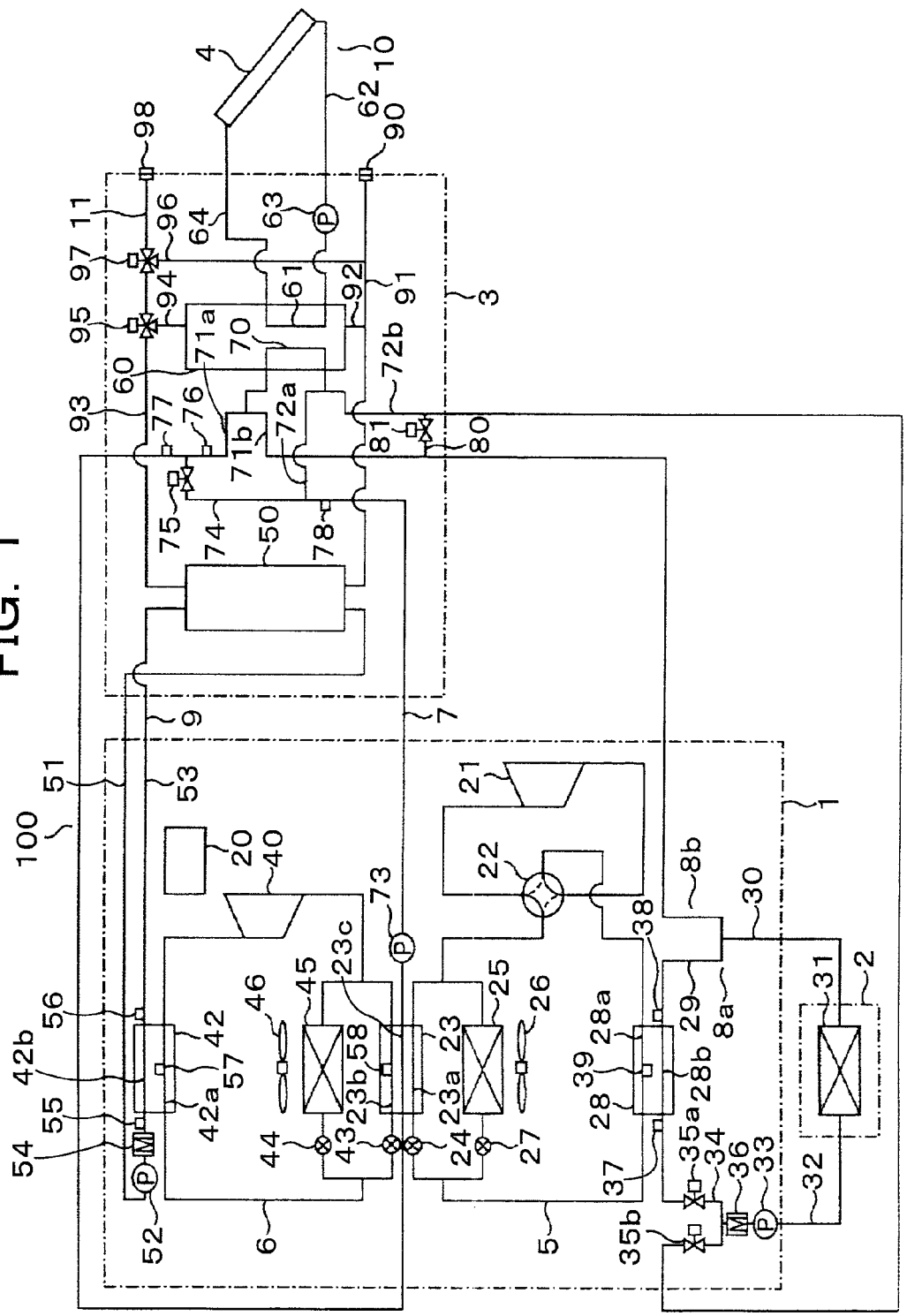
FIG. 1 is a diagram illustrating an air-conditioning hot-water supply system according to a first embodiment of the present invention.

As illustrated in FIG. 1, an air-conditioning hot-water supply system 100 according to the present embodiment includes an air temperature adjusting refrigerant circuit 5, a hot-water supplying refrigerant circuit 6, a heat medium circuit 7 that circulates a heat medium, which stores warm heat or cold heat through heat exchange with a refrigerant circulating in the air temperature adjusting refrigerant circuit 5 and a refrigerant circulating in the hot-water supplying refrigerant circuit 6, and an intermediate heat exchanger 23 that performs a heat exchange among the refrigerant circulating in the air temperature adjusting refrigerant circuit 5, the refrigerant circulating in the hot-water supplying refrigerant circuit 6, and the heat medium circulating in the heat medium circuit 7.

It will specifically be described below. FIG. 1 is a diagram illustrating the air-conditioning hot-water supply system 100. The air-conditioning hot-water supply system 100 includes a heat pump unit 1 that is arranged outdoor, an indoor unit 2 arranged in a room, a hot-water-supply/heat-storage tank unit 3 arranged outdoor, and a solar heat collector 4 arranged outdoor. The air-conditioning hot-water supply system 100 also includes the air temperature adjusting refrigerant circuit 5 that performs a cooling operation and a heating operation in a switchable manner, the hot-water supplying refrigerant circuit 6 that performs a hot-water supplying operation, the heat medium circuit 7 that releases heat or absorbs heat with the use of a warm/cold heat source, air temperature adjusting heat medium circuits 8a and 8b, a hot-water supplying circuit 9, a solar heat collecting heat medium circuit 10, and a hot-water discharge path 11. The heat medium circulating in the heat medium circuit 7 is heated by heat obtained by the solar heat collector 4.

The air temperature adjusting refrigerant circuit 5 and the hot-water supplying refrigerant circuit 6 can be referred to as a low-temperature side refrigerant circuit and a high-temperature side refrigerant circuit, respectively, considering a temperature level of heat in a refrigerating cycle.

The heat pump unit 1 includes the air temperature adjusting refrigerant circuit 5 having a compressor 21 and a utilization-side heat exchanger 28, and the hot-water supplying refrigerant circuit 6 having a compressor 40 and a utilization-side heat exchanger 42, wherein the intermediate heat exchanger 23 is arranged between the air temperature adjusting refrigerant circuit 5 and the hot-water supplying refrigerant circuit 6. The heat medium that performs a heat exchange with the refrigerant circulating in the air temperature adjusting refrigerant circuit 5 and the refrigerant circulating in the hot-water supplying refrigerant circuit 6 is entered into the intermediate heat exchanger 23, wherein a heat exchange is performed among the refrigerant circulating in the air temperature adjusting refrigerant circuit 5, the refrigerant circulating in the hot-water supplying refrigerant circuit 6, and the heat medium.

The air temperature adjusting refrigerant circuit 5 includes the compressor 21 that compresses the air temperature adjusting refrigerant into a high-temperature refrigerant, a four-way valve 22 that changes a direction of the flow of the air temperature adjusting refrigerant between the cooling operation and the heating operation, an air temperature adjusting refrigerant heat-transfer pipe 23a for the intermediate heat exchanger 23 that performs the heat exchange with the hot-water supplying refrigerant in the hot-water supplying refrigerant circuit 6 and the heat medium in the heat medium circuit 7, an expansion valve 24 that is arranged in series with the intermediate heat exchanger 23 and serves as a pressure-reducing device for reducing pressure of the air temperature adjusting refrigerant, an air heat exchanger 25 that is arranged in parallel to the intermediate heat exchanger 23 and performs a heat exchange with outdoor air sent by a fan 26, an expansion valve 27 that is arranged in series with the air heat exchanger 25 and serves as a pressure-reducing device for reducing pressure of the air temperature adjusting refrigerant, and an air temperature adjusting refrigerant heat-transfer pipe 28a for the utilization-side heat exchanger 28 that performs the heat exchange with the heat medium in the air temperature adjusting heat medium circuit 8a, those of which are circularly connected with an air temperature adjusting refrigerant pipe line.

R290 (propane) that is a natural refrigerant having a small global warming potential is used as the refrigerant of the air temperature adjusting refrigerant circuit 5, for example. However, the invention is not limited thereto.

The compressor 21 is a variable displacement compressor that can control capacity. Examples of applicable compressors include a piston type, rotary type, scroll type, screw type, and a centrifugal type. Specifically, the compressor 21 is a scroll type, wherein the capacity can be controlled by an inverter control, and a rotation speed is variable from a low speed to a high speed.

The intermediate heat exchanger 23 is a three-fluid heat exchanger configured such that the air temperature adjusting refrigerant heat-transfer pipe 23a, a hot-water supplying refrigerant heat-transfer pipe 23b, and a heat medium heat-transfer pipe 23c are brought into contact with one another. The utilization-side heat exchanger 28 is configured such that the air temperature adjusting refrigerant heat-transfer pipe 28a and an air temperature adjusting heat medium heat-transfer pipe 28b are brought into contact with each other. The expansion valves 24 and 27 adjust a flow ratio of the refrigerants in the intermediate heat exchanger 23 and the air heat exchanger 25.

The expansion valves 24 and 27 are used to change the flow ratio of the refrigerants in the pipes on which the intermediate heat exchanger 23 and the air heat exchanger 25 are provided. However, a three-way valve may be provided at a branch portion where the pipe is branched into the one to which the intermediate heat exchanger 23 is provided and the other to which the air heat exchanger 25 is provided.

The air temperature adjusting heat medium circuit 8a includes the air temperature adjusting heat medium heat-transfer pipe 28b for the utilization-side heat exchanger 28 of the air temperature adjusting refrigerant circuit 5, an outgoing pipe 29 at the side of the air temperature adjusting refrigerant circuit, an air temperature adjusting outgoing pipe 30, an indoor heat exchanger 31 arranged in the indoor unit 2 for performing the heat exchange with indoor air, an air temperature adjusting heat medium circulation pump 33, an air temperature adjusting return pipe 23 including an air temperature adjusting heat medium flow rate sensor 36, and a return pipe 34, including an on-off valve 35a, at the side of the air temperature adjusting refrigerant circuit, those of which are circularly connected.

The circulation pump 33 is for circulating the heat medium in the air temperature adjusting heat medium circuit 8a, and the flow rate sensor 36 detects the flow rate of the heat medium. The on-off valve 35a makes a changeover between the air temperature adjusting heat medium circuit 8a and a later-described air temperature adjusting heat medium circuit 8b, together with a later-described on-off valve 35b.

The air temperature adjusting heat medium circuit 8b is used, when the temperature of water in the heat storage tank 60 is high enough for performing the heating operation by the indoor heat exchanger 31. In this case, the air temperature adjusting refrigerant circuit 5 does not operate, so that the energy efficiency can be kept high.

Instead of mounting the on-off valve 35a and the on-off valve 35b, a three-way valve may be mounted at the connection portion of the air temperature adjusting return pipe 32, a second return pipe 72b, and a pipe 34.

The hot-water supplying refrigerant circuit 6 includes a compressor 40 that compresses the hot-water supplying refrigerant into a high-temperature refrigerant, a hot-water supplying refrigerant heat-transfer pipe 42a of an utilization-side heat exchanger 42 that performs a heat exchange between the high-temperature hot-water supplying refrigerant and water in the hot-water supplying circuit 9, an expansion valve 43 that serves as a pressure-reducing device for reducing pressure of the hot-water supplying refrigerant, the hot-water supplying refrigerant heat-transfer pipe 23b of the intermediate heat exchanger 23 that performs the heat exchange with the air temperature adjusting refrigerant in the air temperature adjusting refrigerant circuit 5 and the heat medium in the heat medium circuit 7 for evaporating the hot-water supplying refrigerant having low temperature and low pressure, an expansion valve 44 that is arranged in parallel to the expansion valve 43 and serves as a pressure-reducing device for reducing pressure of the hot-water supplying refrigerant, and an air heat exchanger 45 that is arranged in series with the expansion valve 44, and performs a heat exchange with the indoor air sent by a fan 46 for evaporating the refrigerant having low temperature and low pressure, those of which are circularly connected with a hot-water supplying refrigerant pipe line.

HFO1234yf having a small global warming potential is used as the refrigerant of the hot-water supplying refrigerant circuit 6, for example. However, the invention is not limited thereto. The HFO1234yf is a low-pressure refrigerant. Therefore, if this is used as the refrigerant, the thickness of the pipe can be advantageously reduced.

The compressor 40 can change capacity by an inverter control, and its rotation speed can be changed from a low speed to a high speed, as in the compressor 21. The utilization-side heat exchanger 42 is configured such that the hot-water supplying refrigerant heat-transfer pipe 42a and the hot-water supplying water heat-transfer pipe 42b are brought into contact with each other. The expansion valves 43 and 44 adjust a flow ratio of the refrigerants in the intermediate heat exchanger 23 and the air heat exchanger 45.

The expansion valves 43 and 44 are used to change the flow ratio of the refrigerants in the pipes on which the intermediate heat exchanger 23 and the air heat exchanger 45 are provided. However, a three-way valve may be provided at a branch portion where the pipe is branched into the one to which the intermediate heat exchanger 23 is provided and the other to which the air heat exchanger 45 is provided.

The hot-water supplying circuit 9 is configured to circularly connect a lower part of a hot-water supply tank 50, a hot-water supplying outgoing pipe 51 including a hot-water supplying water circulation pump 52 and a hot-water supplying water flow rate sensor 54, hot-water supplying heat-transfer pipe 42b for the utilization-side heat exchanger 42 of the hot-water supplying refrigerant circuit 6, and a hot-water supplying return pipe 53. The circulation pump 52 circulates water in the hot-water supplying circuit 9, and the flow rate sensor 54 detects a flow rate of water. Hot water is stored in the hot-water supply tank 50.

A solar heat collecting heat medium circuit 10 includes an in-tank first heat exchanger 61 that releases heat to the water in the heat storage tank 60, a solar heat collecting outgoing pipe 62 including a solar heat collecting heat medium circulation pump 63, the solar heat collector 4, and a solar heat collecting return pipe 64, those of which are circularly connected.

The solar heat collector 4 heats the heat medium with solar heat. The circulation pump 63 circulates the heat medium in the solar heat collecting heat medium circuit 10.

The heat medium circuit 7 includes an in-tank second heat exchanger 70 that absorbs heat from or releases heat to the water in the heat storage tank 60, a first outgoing pipe 71a, the heat medium heat-transfer pipe 23c of the intermediate heat exchanger 23 that performs the heat exchange with the air temperature adjusting refrigerant in the air temperature adjusting refrigerant circuit 5 and the hot-water supplying refrigerant in the hot-water supplying refrigerant circuit 6, and a first return pipe 72a including the circulation pump 73, those of which are circularly connected. It also includes a bypass pipe 74 that connects the first outgoing pipe 71a and the return pipe 72a, and that includes a bypass valve 75.

The bypass valve 75 bypasses a part of the heat medium, whose temperature is changed by the intermediate heat exchanger 23, in the return pipe 72a to the bypass pipe 74 so as to mix the same with the heat medium, which absorbs heat from or releases heat to the water in the heat storage tank 60 with the in-tank second heat exchanger 70, thereby supplying the heat medium having a desired temperature to the intermediate heat exchanger 23.

The method of adjusting the heat medium to an appropriate temperature for utilization is not limited to the method of providing the bypass. For example, a pump that can change a flow rate may be employed as the pump 73, and the flow speed of the pump may be adjusted to change a quantity of absorbed heat and a quantity of released heat.

The air temperature adjusting heat medium circuit 8b that is changed from the air temperature adjusting heat medium circuit 8a includes the in-tank second heat exchanger 70 that absorbs heat from or releases heat to the water in the heat storage tank 60, a second outgoing pipe 71b, the air temperature adjusting outgoing pipe 30, the indoor heat exchanger 31 that is arranged in the indoor unit 2 for performing the heat exchange with the indoor air, the air temperature adjusting return pipe 32 including the air temperature adjusting heat medium circulation pump 33 and the flow rate sensor 36, and the second return pipe 72b including the on-off valve 35b, those of which are circularly connected. It also includes a bypass pipe 80 that connects the second outgoing pipe 71b and the return pipe 72b, and that includes a bypass valve 81.

The bypass, which serves in the same way as the bypass valve 75, valve 81 bypasses a part of the heat medium, whose temperature is changed by the indoor heat exchanger 31, in the return pipe 72b to the bypass pipe 80 so as to mix the same with the heat medium, which absorbs heat from or releases heat to the water in the heat storage tank 60 with the in-tank second heat exchanger 70, thereby supplying the heat medium having a desired temperature to the indoor heat exchanger 31.

The hot water discharge path 11 includes the hot-water supply tank 50, the heat storage tank 60, a water supply metal fitting 90 that is connected to a waterworks outside the hot-water-supply/heat-storage tank unit 3, a water supply pipe 91 that connects the water supply metal fitting 90 and the lower part of the hot-water supply tank 50, a first water supply branch pipe 92 that connects the water supply pipe 91 and the lower part of the heat storage tank 60, a hot-water supply pipe 93 including a first hot-water supply mixing valve 95 and a second hot-water supply mixing valve 97, a hot-water supply metal fitting 98 that is connected to the hot-water supply pipe 93 and an external hot-water supply terminal, a hot-water discharge pipe 94 that connects the upper part of the heat storage tank 60 and the hot-water supply mixing valve 95, and a second water supply branch pipe 96 that connects the water supply pipe 91 and the second hot-water supply mixing valve 97. The heat storage tank may independently be provided without being connected to the hot-water discharge path 11, from the viewpoint of a function of storing heat.

The hot-water supply mixing valve 95 mixes the hot water in the hot-water supply tank 50 and the hot water in the heat storage tank 70, while the hot-water supply mixing valve 97 mixes the hot water mixed by the hot-water supply mixing valve 95 and the water from the second water supply branch pipe 96, and supplies water with a desired temperature from the hot-water supply metal fitting 98.

The air-conditioning hot-water supply system 100 includes plural temperature sensors. For example, the air temperature adjusting heat medium circuit 8a includes temperature sensors 37 and 38 that detect a temperature of an inlet and a temperature of an outlet of the air temperature adjusting heat medium heat-transfer pipe 28b of the utilization-side heat exchanger 28 in the air temperature adjusting refrigerant circuit 5. A temperature sensor 39 for detecting the refrigerant temperature is provided to the air temperature adjusting refrigerant heat-transfer pipe 28a of the utilization-side heat exchanger 28. The hot-water supplying circuit 9 includes temperature sensors 55 and 56 that detect a temperature of an inlet and a temperature of an outlet of the hot-water supplying water heat-transfer pipe 42b of the utilization-side heat exchanger 42 in the hot-water supplying refrigerant circuit 6. A temperature sensor 57 for detecting the refrigerant temperature is provided to the hot-water supplying refrigerant heat-transfer pipe 42a of the utilization-side heat exchanger 42 in the hot-water supplying refrigerant circuit 6, and a temperature sensor 58 for detecting the refrigerant temperature is provided to the hot-water supplying refrigerant heat-transfer pipe 23b in the intermediate heat exchanger 23.

The heat medium circuit 7 includes a temperature sensor 76 for detecting the temperature of the heat medium from the in-tank second heat exchanger 70, a temperature sensor 77 for detecting the temperature of the heat medium going to the intermediate heat exchanger 23, and a temperature sensor 78 for detecting the temperature of the heat medium returning from the intermediate heat exchanger 23.

The intermediate heat exchanger 23 is configured such that a part of the pipe line of the air temperature adjusting refrigerant circuit 5, a part of the pipe line of the hot-water supplying refrigerant circuit 6, and a part of the pipe line of the heat medium circuit 7 are integrally adjacent to one another, and it can also be referred to as a three-fluid heat exchanger.

A control device 20 receives an input from an unillustrated remote controller and signals from various temperature sensors, and controls the compressors 21 and 40, the four-way valve 22, the expansion valves 24, 27, 43, and 44, the circulation pumps 33, 52, 63, and 73, and the other components, based on these signals.

The hot-water supplying operation, the heating operation, and the cooling operation of the air-conditioning hot-water supply system 100 thus configured will next be described below. FIG. 2 is a table illustrating conditions in the respective operation modes, and FIGS. 3 to 14 illustrate system diagrams illustrating flows of the refrigerants, water, and heat medium in the respective operation modes.

Figure 3:
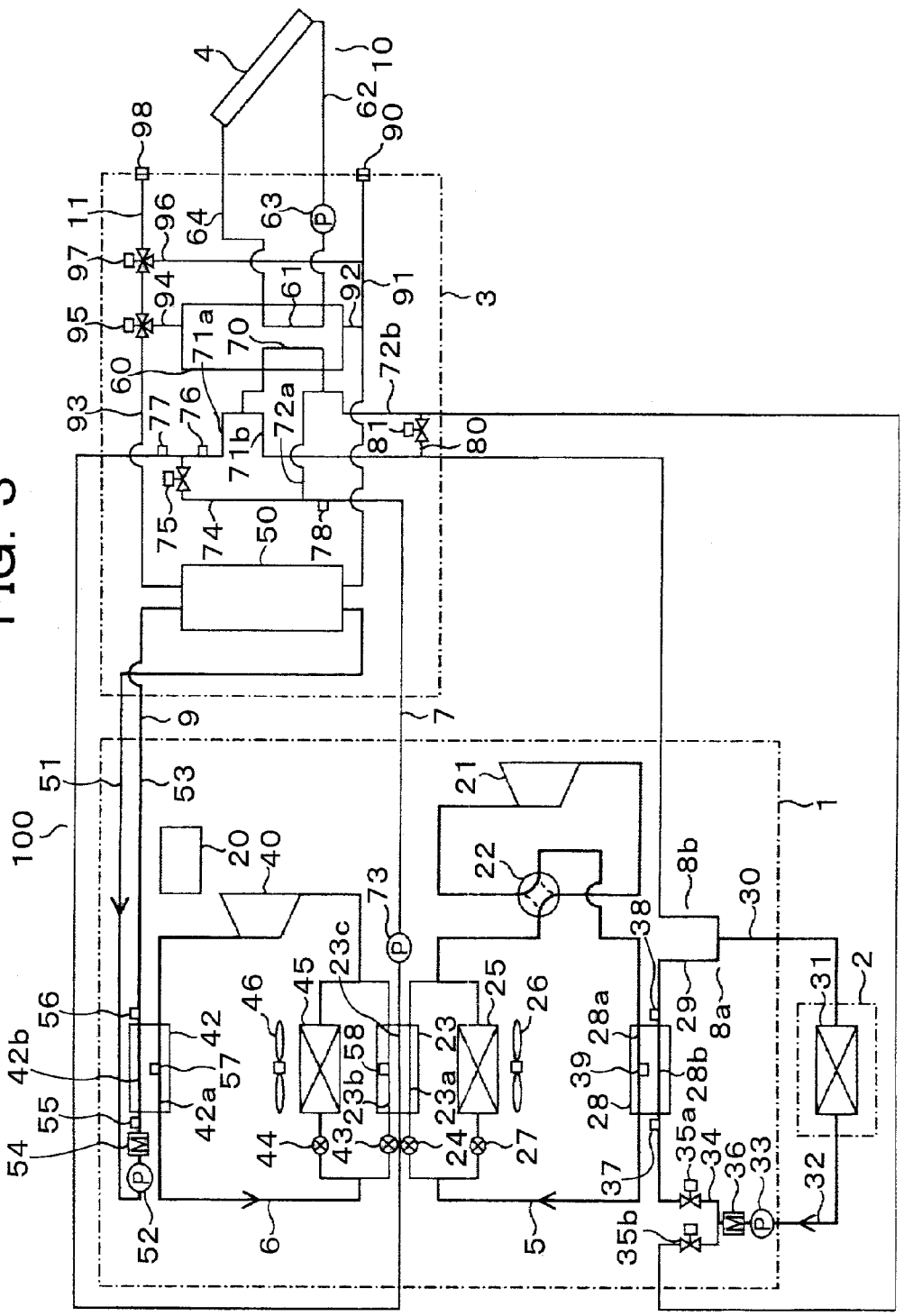
FIG. 3 is a diagram illustrating flows of refrigerants, water, and heat medium in an operation mode No. 1-0 in FIG. 2 according to the first embodiment of the present invention.

Firstly, the hot-water supplying operation and heating operation in <1> Operation mode No. 1-0 in FIG. 3 will be described. In this mode, heat in the air is used as a heat source for the hot-water supply and heating. FIG. 3 illustrates the flows of the refrigerants, water, and heat medium. In this case, the expansion valve 24 of the air temperature adjusting refrigerant circuit 5 and the expansion valve 43 of the hot-water supplying refrigerant circuit 6 are fully closed, so that the refrigerants do not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium. The heat medium circuit 7 does not operate.

In the air temperature adjusting refrigerant circuit 5, the gas refrigerant that is compressed by the compressor 21 to have high temperature and high pressure passes through the four-way valve 22, and flows into the air temperature adjusting refrigerant heat-transfer pipe 28a of the utilization-side heat exchanger 28. The high-temperature high-pressure gas refrigerant flowing in the air temperature adjusting refrigerant heat-transfer pipe 28a is cooled by the heat medium flowing through the air temperature adjusting heat medium heat-transfer pipe 28b (it is condensed and liquefied, depending upon a type of the refrigerant). The pressure of the high-pressure refrigerant is reduced by the expansion valve 27, whereby this refrigerant becomes a low-temperature low-pressure refrigerant (gas-liquid two-phase refrigerant, depending upon a type of the refrigerant). In the air heat exchanger 25, this refrigerant is heated by the outdoor air sent by the fan 26 (evaporated depending upon a type of the refrigerant), and becomes a low-pressure gas refrigerant. This low-pressure gas refrigerant passes through the four-way valve 22, and returns again to the compressor 21.

In the air temperature adjusting heat medium circuit 8a, the heat medium delivered by the operation of the circulation pump 33 passes through the pipe 34, and flows into the air temperature adjusting heat medium heat-transfer pipe 28b of the utilization-side heat exchanger 28. The heat medium flowing in the air temperature adjusting heat medium heat-transfer pipe 28b is heated by the high-temperature refrigerant flowing in the air temperature adjusting refrigerant heat-transfer pipe 28a, so that the temperature of the heat medium increases. The heat medium having the increased temperature passes through the outgoing pipes 29 and 30, and is cooled by the indoor air in the indoor heat exchanger 31, whereby the temperature thereof lowers. In this case, the indoor air is heated to heat the room. The heat medium whose temperature is decreased passes through the return pipe 32, and returns again to the circulation pump 33.

In the hot-water supplying refrigerant circuit 6, the gas refrigerant, which is compressed by the compressor 40 to have high temperature and high pressure, flows into the hot-water supplying refrigerant heat-transfer pipe 42a of the utilization-side heat exchanger 42. The high-temperature high-pressure gas refrigerant flowing in the hot-water supplying refrigerant heat-transfer pipe 42a is cooled by the water flowing in the hot-water supplying water heat-transfer pipe 42b (it is condensed and liquefied depending upon a type of the refrigerant). The pressure of the high-pressure refrigerant is reduced by the expansion valve 44, whereby this refrigerant becomes a low-temperature low-pressure refrigerant (gas-liquid two-phase refrigerant, depending upon a type of the refrigerant). This refrigerant is heated by the outdoor air sent by the fan 26 (evaporated depending upon a type of the refrigerant), and becomes a low-pressure gas refrigerant in the air heat exchanger 45. The low-pressure refrigerant again returns to the compressor 40.

In the hot-water supplying circuit 9, the water flowing out of the bottom of the hot-water supply tank 50 due to the operation of the circulation pump 52 passes through the outgoing pipe 51 to flow into the hot-water supplying water heat-transfer pipe 42b of the utilization-side heat exchanger 42. The water flowing through the hot-water supplying water heat-transfer pipe 42b is heated by the high-temperature refrigerant flowing through the hot-water supplying refrigerant heat-transfer pipe 42a, so that the temperature thereof is increased. The water then passes through the return pipe 53 to be returned to the top of the hot-water supply tank 50, whereby hot-water with high temperature is stored.

Figure 4:
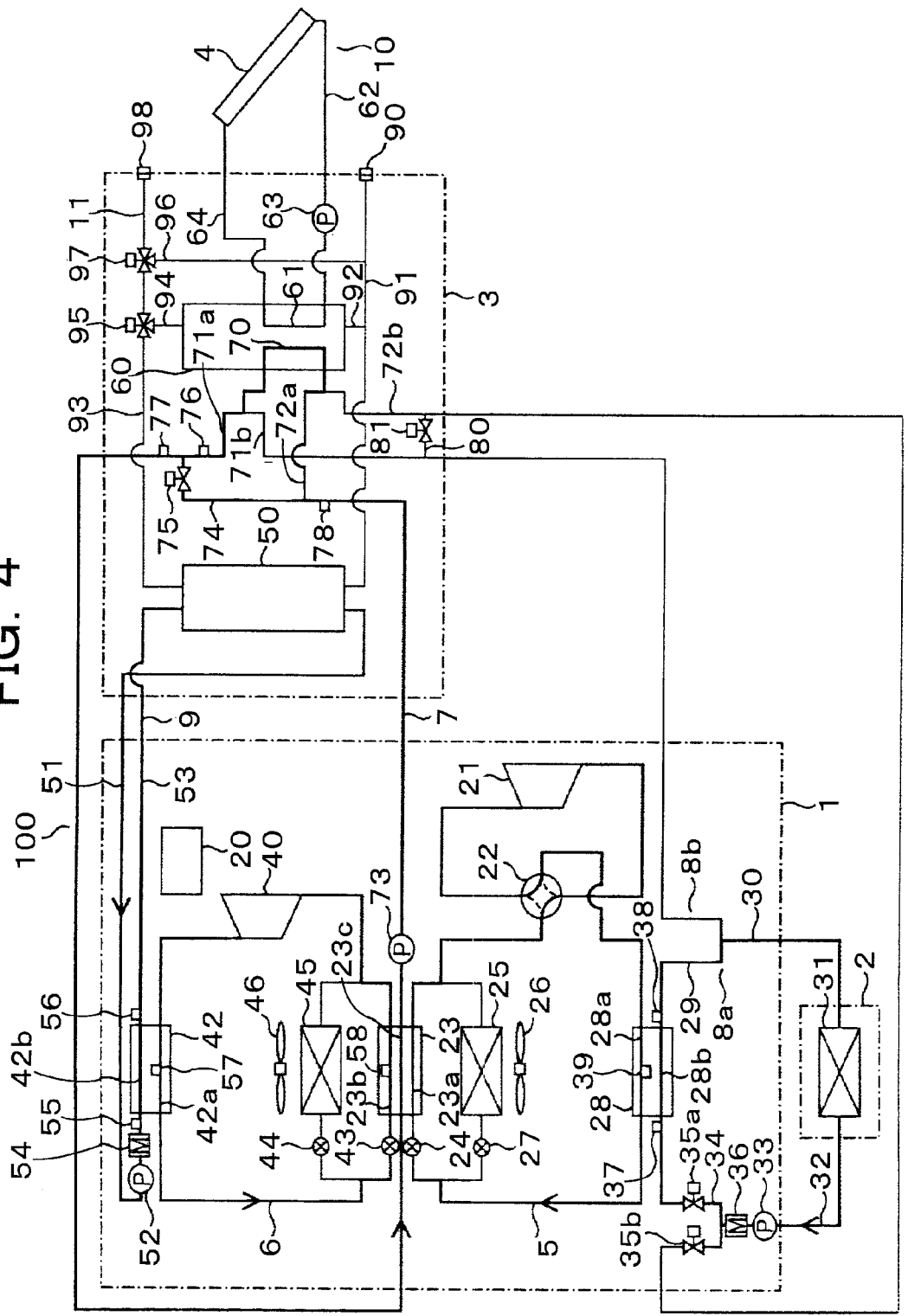
FIG. 4 is a diagram illustrating flows of refrigerants, water, and heat medium in an operation mode No. 1-1 in FIG. 2 according to the first embodiment of the present invention.

Next, the hot-water supplying operation and heating operation in <2> Operation mode No. 1-1 in FIG. 4 will be described. In this mode, the intermediate heat exchanger 23 functions as the evaporator of the air temperature adjusting refrigerant circuit 5, and as the evaporator of the hot-water supplying refrigerant circuit 6, wherein the warm heat of the heat medium, circulating in the heat medium circuit 7, is applied to the refrigerant circulating in the air temperature adjusting refrigerant circuit 5 and the refrigerant circulating in the hot-water supplying refrigerant circuit 6, in the intermediate heat exchanger 23. With this process, the air heating operation (i.e., heating operation) by the air temperature adjusting refrigerant circuit 5, and the hot-water supplying operation by the hot-water supplying refrigerant circuit 6 are performed.

Specifically, hot water in the heat storage tank 60 is used as the heat source for the hot-water supplying operation and heating operation. The hot water in the heat storage tank 60 is the one heated by solar heat by the solar heat collecting heat medium circuit 10. FIG. 4 illustrates the flows of the refrigerants, water, and heat medium. In this case, the expansion valve 27 of the air temperature adjusting refrigerant circuit 5 and the expansion valve 44 of the hot-water supplying refrigerant circuit 6 are fully closed, so that the refrigerants do not flow. The on-off valve 35a of the air temperature adjusting heat medium circuit 8a is opened to allow the heat medium to flow, while the on-off valve 35b of air temperature adjusting heat medium circuit 8b is closed to inhibit the flow of the heat medium.

The operation of the air temperature adjusting heat medium circuit 8a is the same as that in the above-mentioned <1> Operation mode No. 1-0.

In the hot-water supplying refrigerant circuit 6, the gas refrigerant, which is compressed by the compressor 40 to have high temperature and high pressure, flows into the hot-water supplying refrigerant heat-transfer pipe 42a of the utilization-side heat exchanger 42. The high-temperature high-pressure gas refrigerant flowing in the hot-water supplying refrigerant heat-transfer pipe 42a is cooled by the water flowing through the hot-water supplying water heat-transfer pipe 42b (it is condensed and liquefied, depending upon a type of the refrigerant). The pressure of the high-pressure refrigerant is reduced by the expansion valve 43, whereby this refrigerant becomes a low-temperature low-pressure refrigerant (gas-liquid two-phase refrigerant, depending upon a type of the refrigerant). This refrigerant is heated by the heat medium flowing through the heat medium heat-transfer pipe 23c (evaporated depending upon a type of the refrigerant), and becomes a low-pressure gas refrigerant in the hot-water supplying refrigerant heat-transfer pipe 23b of the intermediate heat exchanger 23. The low-pressure gas refrigerant returns again to the compressor 40.

The operation of the hot-water supplying circuit 9 is the same as that in the above-mentioned <1> Operation mode No. 1-0.

In the heat medium circuit 7, the heat medium heated by the second heat exchanger 70 in the heat storage tank 60 passes through the outgoing pump 71a due to the operation of the circulation pipe 73 to flow into the heat medium heat-transfer pipe 23c of the intermediate heat exchanger 23. The heat medium flowing through the heat medium heat-transfer pipe 23c is cooled by the low-temperature refrigerants flowing through the air temperature adjusting refrigerant heat-transfer pipe 23a and the hot-water supplying refrigerant heat-transfer pipe 23b, so that the temperature thereof is reduced. Then, the heat medium passes through the return pipe 72a to return again to the second heat exchanger 70 in the heat storage tank 60.

Next, modes for the hot-water supplying operation and the cooling operation will be described. In these modes, the intermediate heat exchanger 23 functions as the condenser of the air temperature adjusting refrigerant circuit 5, and as the evaporator of the hot-water supplying refrigerant circuit 6, wherein the warm heat of the refrigerant, circulating in the air temperature adjusting refrigerant circuit 5, is applied to the refrigerant circulating in the hot-water supplying refrigerant circuit 6, in the intermediate heat exchanger 23. With this process, the air cooling operation (i.e., cooling operation) by the air temperature adjusting refrigerant circuit 5, and the hot-water supplying operation by the hot-water supplying refrigerant circuit 6 are performed.

Specifically, the air heat exchanger 25 arranged in parallel to the intermediate heat exchanger 23 in the air temperature adjusting refrigerant circuit 5, and the air heat exchanger 45 arranged in parallel to the intermediate heat exchanger 23 in the hot-water supplying refrigerant circuit 6 are used. When a required heat quantity of the refrigerant, circulating in the hot-water supplying refrigerant circuit 6, in the intermediate heat exchanger 23 and the quantity of discharged heat of the refrigerant, circulating in the air temperature adjusting refrigerant circuit 5, in the intermediate heat exchanger 23 are not balanced, it is considered that the insufficient heat is made up by the heat exchange in the air heat exchanger 25 or the air heat exchanger 45.

Figure 5:
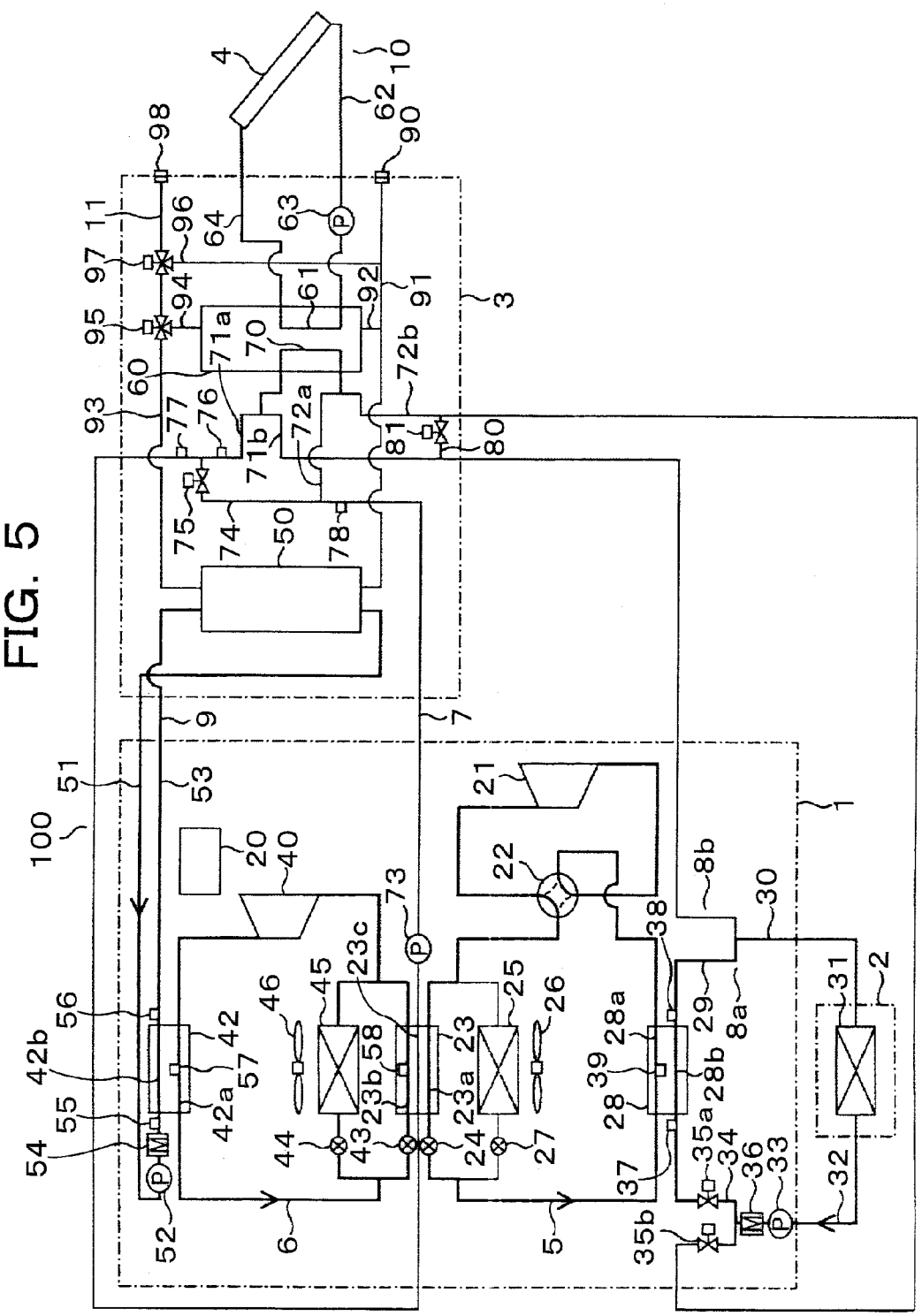
FIG. 5 is a diagram illustrating flows of refrigerants, water, and heat medium in an operation mode No. 2-0a in FIG. 2 according to the first embodiment of the present invention.

The <3> Operation mode No. 2-0a in FIG. 5 is applied when the heat source (heat absorption) for supplying hot water is larger than the discharged heat in the cooling operation, wherein the discharged heat in the cooling operation and the heat in the air are used as the heat source for the hot-water supply. FIG. 5 illustrates the flows of the refrigerants, water, and heat medium. This mode is excellent in that it can be applied for the hot-water supplying operation and the cooling operation in which the quantity of absorbed heat for the hot-water supply is larger than the quantity of discharged heat for the cooling operation.

In this case, the expansion valve 27 of the air temperature adjusting refrigerant circuit 5 is fully closed, so that the refrigerant does not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium. The heat medium circuit 7 does not operate.

In the air temperature adjusting refrigerant circuit 5, the gas refrigerant that is compressed by the compressor 21 to have high temperature and high pressure passes through the four-way valve 22, and flows into the air temperature adjusting refrigerant heat-transfer pipe 23a of the intermediate heat exchanger 23. The high-temperature high-pressure gas refrigerant flowing in the air temperature adjusting refrigerant heat-transfer pipe 23a is cooled by the low-temperature refrigerant flowing through the hot-water supplying heat-transfer pipe 23b (it is condensed and liquefied, depending upon a type of the refrigerant). The pressure of the high-pressure refrigerant is reduced by the expansion valve 24, whereby this refrigerant becomes a low-temperature low-pressure refrigerant (gas-liquid two-phase refrigerant, depending upon a type of the refrigerant). This refrigerant flows into the air temperature adjusting refrigerant heat-transfer pipe 28a of the utilization-side heat exchanger 28. The gas-liquid two-phase refrigerant flowing through the air temperature adjusting refrigerant heat-transfer pipe 28a is heated by the heat medium, having high temperature and flowing through the air temperature adjusting heat medium heat-transfer pipe 28b, (evaporated depending upon a type of the refrigerant), and becomes a low-pressure gas refrigerant. The low-pressure gas refrigerant passes through the four-way valve 22, and returns again to the compressor 21.

In the air temperature adjusting heat medium circuit 8a, the heat medium delivered due to the operation of the circulation pump 33 passes through the pipe 34 to flow into the air temperature adjusting heat medium heat-transfer pipe 28b of the utilization-side heat exchanger 28. The heat medium flowing through the air temperature adjusting heat medium heat-transfer pipe 28b is cooled by the low-temperature refrigerant flowing through the air temperature adjusting refrigerant heat-transfer pipe 28a, so that the temperature thereof is reduced. The heat medium whose temperature is decreased passes through the outgoing pipes 29 and 30, and heated by the indoor air in the indoor heat exchanger 31, whereby the temperature thereof increases. In this case, the indoor air is cooled to perform the cooling operation. The heat medium having the increased temperature passes through the return pipe 32, and returns again to the circulation pump 33.

In the hot-water supplying refrigerant circuit 6, the gas refrigerant, which is compressed by the compressor 40 to have high temperature and high pressure, flows into the hot-water supplying refrigerant heat-transfer pipe 42a of the utilization-side heat exchanger 42. The high-temperature high-pressure gas refrigerant flowing in the hot-water supplying refrigerant heat-transfer pipe 42a is cooled by the water flowing in the hot-water supplying water heat-transfer pipe 42b (it is condensed and liquefied depending upon a type of the refrigerant). The pressure of the high-pressure refrigerant is reduced by the expansion valves 43 and 44. In this case, the expansion valves 43 and 44 adjust the flow ratio of the refrigerant flowing through the intermediate exchanger 23 and the refrigerant flowing through the air heat exchanger 45. The refrigerant whose pressure is reduced by the expansion valve 43 to become the low-temperature low-pressure refrigerant (gas-liquid two-phase refrigerant, depending upon a type of the refrigerant) is heated and evaporated by the refrigerant, having high temperature and flowing through the air temperature adjusting refrigerant heat-transfer pipe 23a, in the hot-water supplying refrigerant heat-transfer pipe 23b of the intermediate heat exchanger 23, whereby this refrigerant becomes a low-pressure gas refrigerant. On the other hand, the refrigerant whose pressure is reduced by the expansion valve 44 to become the low-temperature low-pressure refrigerant is heated by the outdoor air sent by the fan 46 (evaporated depending upon the type of the refrigerant), and becomes a low-pressure gas refrigerant in the air heat exchanger 45. The gas refrigerant flowing out of the intermediate heat exchanger 23 and the air heat exchanger 45 again returns to the compressor 40. In this case, the discharged heat of the cooling operation and the heat in the air are used as the heat source for the hot-water supply.

The operation of the hot-water supplying circuit 9 is the same as that in the above-mentioned <1> Operation mode No. 1-0.

Figure 6:
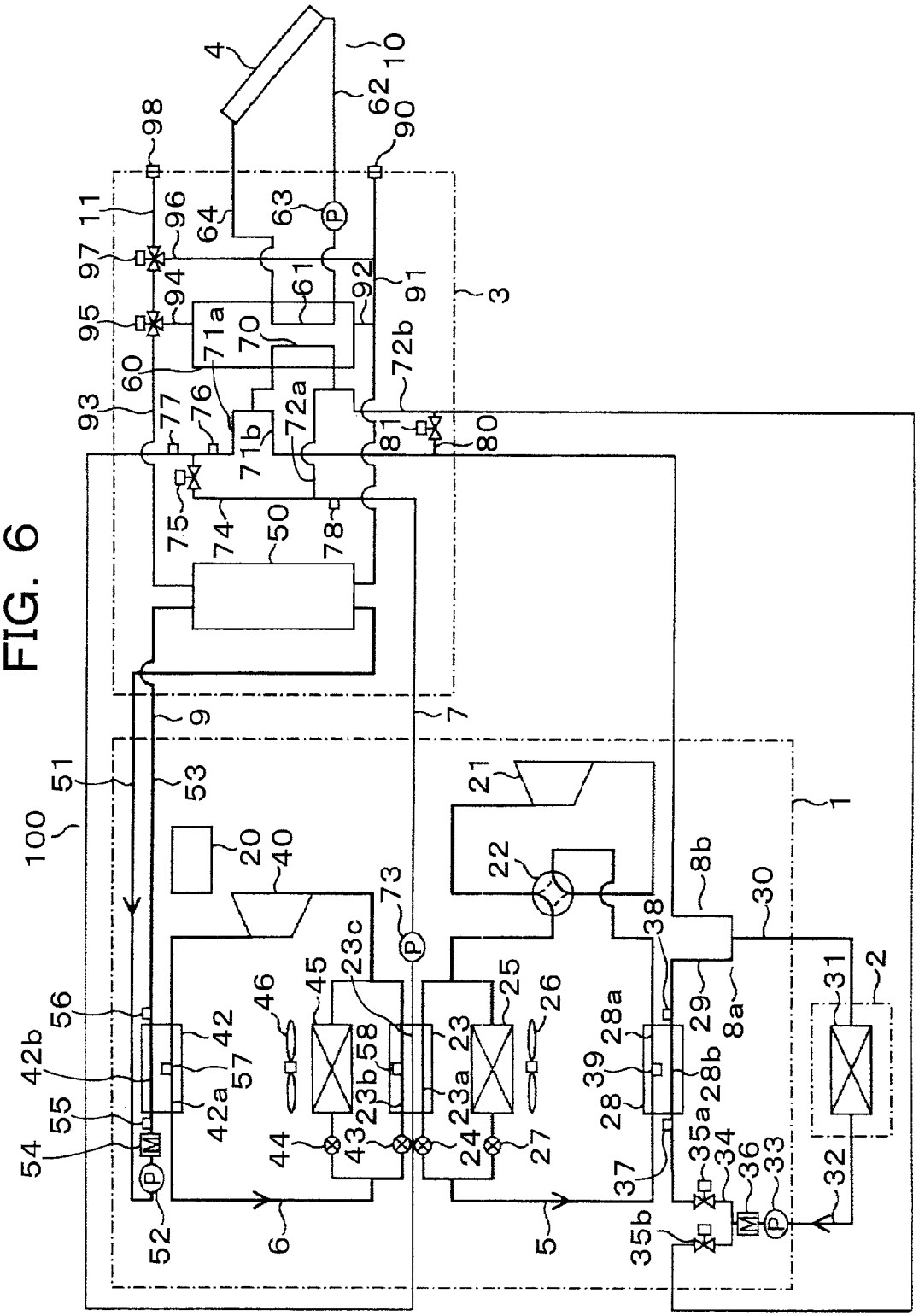
FIG. 6 is a diagram illustrating flows of refrigerants, water, and heat medium in an operation mode No. 2-0b in FIG. 2 according to the first embodiment of the present invention.

The <4> Operation mode No. 2-0b in FIG. 6 is applied when the heat source (heat absorption) for supplying hot water is smaller than the discharged heat for the cooling operation, wherein the surplus heat discharge for the cooling operation is absorbed by air. FIG. 6 illustrates the flows of the refrigerants, water, and heat medium. In this case, the expansion valve 44 of the hot-water supplying refrigerant circuit 6 is fully closed, so that the refrigerant does not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium. The heat medium circuit 7 does not operate.

In the air temperature adjusting refrigerant circuit 5, the gas refrigerant that is compressed by the compressor 21 to have high temperature and high pressure passes through the four-way valve 22, and flows into the air temperature adjusting refrigerant heat-transfer pipe 23a of the intermediate heat exchanger 23 and the air heat exchanger 25. The high-temperature high-pressure gas refrigerant flowing into the air temperature adjusting refrigerant heat-transfer pipe 23a is cooled by the low-temperature refrigerant flowing through the hot-water supplying heat-transfer pipe 23b (it is condensed and liquefied, depending upon a type of the refrigerant). On the other hand, the high-temperature high-pressure gas refrigerant flowing into the air heat exchanger 25 is cooled by the outdoor air sent by the fan 26, thereby being condensed and liquefied. The pressure of each of the high-pressure refrigerants flowing out of the intermediate heat exchanger 23 and the air heat exchanger 25 is reduced by the expansion valves 24 and 27, whereby these refrigerants become low-temperature low-pressure refrigerants (gas-liquid two-phase refrigerants, depending upon a type of the refrigerant). In this case, the expansion valves 24 and 27 adjust the flow ratio of the refrigerant flowing through the intermediate heat exchanger 23 and the refrigerant flowing through the air heat exchanger 25. The low-temperature low-pressure refrigerant flows into the air temperature adjusting refrigerant heat-transfer pipe 28a of the utilization-side heat exchanger 28, heated by the heat medium, having high temperature and flowing through the air temperature adjusting heat medium heat-transfer pipe 28b, (evaporated depending upon a type of the refrigerant), and becomes a low-pressure gas refrigerant. The low-pressure gas refrigerant passes through the four-way valve 22, and returns again to the compressor 21. In this case, the surplus heat discharge, which is not utilized as the heat source for the hot-water supply, for the cooling operation is absorbed by air.

The operation of the air temperature adjusting heat medium circuit 8a is the same as that in the above-mentioned <322 Operation mode No. 2-0a.

In the hot-water supplying refrigerant circuit 6, the gas refrigerant, which is compressed by the compressor 40 to have high temperature and high pressure, flows into the hot-water supplying refrigerant heat-transfer pipe 42a of the utilization-side heat exchanger 42. The high-temperature high-pressure gas refrigerant flowing in the hot-water supplying refrigerant heat-transfer pipe 42a is cooled by the water flowing in the hot-water supplying water heat-transfer pipe 42b (it is condensed and liquefied depending upon a type of the refrigerant). The pressure of the high-pressure refrigerant is reduced by the expansion valve 43, whereby this refrigerant becomes a low-temperature low-pressure refrigerant (gas-liquid two-phase refrigerant, depending upon a type of the refrigerant). This refrigerant is heated (evaporated depending upon a type of the refrigerant) by the refrigerant, having high temperature and flowing in the air temperature adjusting refrigerant heat-transfer pipe 23a, in the hot-water supplying refrigerant heat-transfer pipe 23b of the intermediate heat exchanger 23, and becomes a low-pressure gas refrigerant. The low-pressure gas refrigerant again returns to the compressor 40. In this case, the discharged heat in the cooling operation is used as the heat source for the hot-water supply.

The operation of the hot-water supplying circuit 9 is the same as that in the above-mentioned <1> Operation mode No. 1-0.

As the mode for the hot-water supplying operation and the cooling operation, it is considered that the insufficient heat is made up by the heat exchange with the heat medium circulating in the heat medium circuit 7, when a required heat quantity of the refrigerant, circulating in the hot-water supplying refrigerant circuit 6, in the intermediate heat exchanger 23 and the quantity of discharged heat of the refrigerant, circulating in the air temperature adjusting refrigerant circuit 5, in the intermediate heat exchanger 23 are not balanced.

Figure 7:
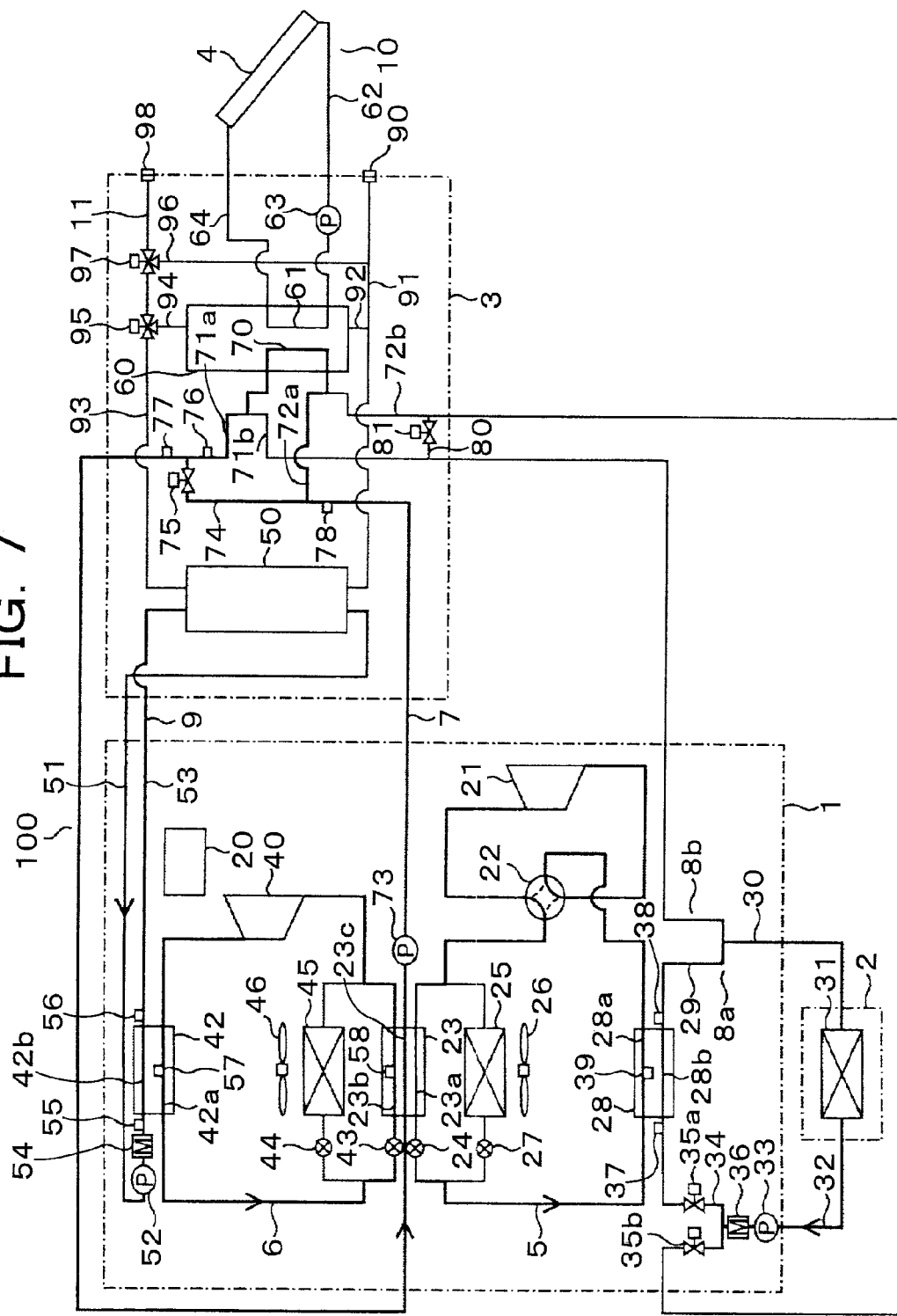
FIG. 7 is a diagram illustrating flows of refrigerants, water, and heat medium in an operation mode No. 2-1 in FIG. 2 according to the first embodiment of the present invention.

The <5> Operation mode No. 2-1 in FIG. 7 is applied when the heat source (heat absorption) for supplying hot water is larger than the discharged heat for the cooling operation, wherein the discharged heat for the cooling operation and the hot water in the heat storage tank 60 are used as the heat source for the hot-water supply. This mode is excellent in that it can be applied for the hot-water supplying operation and the cooling operation in which the quantity of absorbed heat for the hot-water supply is larger than the quantity of discharged heat for the cooling operation.

In this mode, the hot water is employed instead of the heat in the air in the <3> Operation mode No. 2-0a. The hot water in the heat storage tank 60 is the one heated by solar heat by the solar heat collecting heat medium circuit 10. FIG. 7 illustrates the flows of the refrigerants, water, and heat medium. In this case, the expansion valve 27 of the air temperature adjusting refrigerant circuit 5 and the expansion valve 43 of the hot-water supplying refrigerant circuit 6 are fully closed, so that the refrigerants do not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium.

The operation of the air temperature adjusting refrigerant circuit 5 and the operation of the air temperature adjusting heat medium circuit 8a are the same as those in the above-mentioned <3> Operation mode No. 2-0a.

In the hot-water supplying refrigerant circuit 6, the gas refrigerant, which is compressed by the compressor 40 to have high temperature and high pressure, flows into the hot-water supplying refrigerant heat-transfer pipe 42a of the utilization-side heat exchanger 42. The high-temperature high-pressure gas refrigerant flowing in the hot-water supplying refrigerant heat-transfer pipe 42a is cooled by the water flowing through the hot-water supplying water heat-transfer pipe 42b (it is condensed and liquefied depending upon a type of the refrigerant). The pressure of the high-pressure refrigerant is reduced by the expansion valve 43. The refrigerant that becomes the low-temperature low-pressure refrigerant (gas-liquid two-phase refrigerant, depending upon a type of the refrigerant) is heated by the refrigerant, having high temperature and flowing through the air temperature adjusting refrigerant heat-transfer pipe 23a, and by the heat medium, having high temperature and flowing through the heat medium heat-transfer pipe 23c, in the hot-water supplying refrigerant heat-transfer pipe 23b of the intermediate heat exchanger 23, (evaporated depending upon a type of the refrigerant), whereby this refrigerant becomes a low-pressure gas refrigerant, and returns to the compressor 40 again. In this case, the discharged heat of the cooling operation and hot water are used as the heat source for the hot-water supply.

The operation of the hot-water supplying circuit 9 is the same as that in the above-mentioned <1> Operation mode No. 1-0.

In the heat medium circuit 7, the heat medium heated by the second heat exchanger 70 in the heat storage tank 60 passes through the outgoing pipe 71a due to the operation of the circulation pump 73 to flow into the heat medium heat-transfer pipe 23c of the intermediate heat exchanger 23. The heat medium flowing through the heat medium heat-transfer pipe 23c is cooled by the low-temperature refrigerant flowing through the hot-water supplying refrigerant heat-transfer pipe 23b, so that the temperature thereof is reduced. Then, the heat medium passes through the return pipe 72a to return again to the second heat exchanger 70 in the heat storage tank 60.

Notably, the <5> Operation mode No. 2-1 is a mode in which the low-pressure refrigerant of the hot-water supplying refrigerant circuit 6 absorbs heat. Therefore, it is necessary that the temperature of the water in the heat storage tank 60 is higher than the temperature (i.e., evaporation temperature) of the low-pressure refrigerant.

Figure 8:
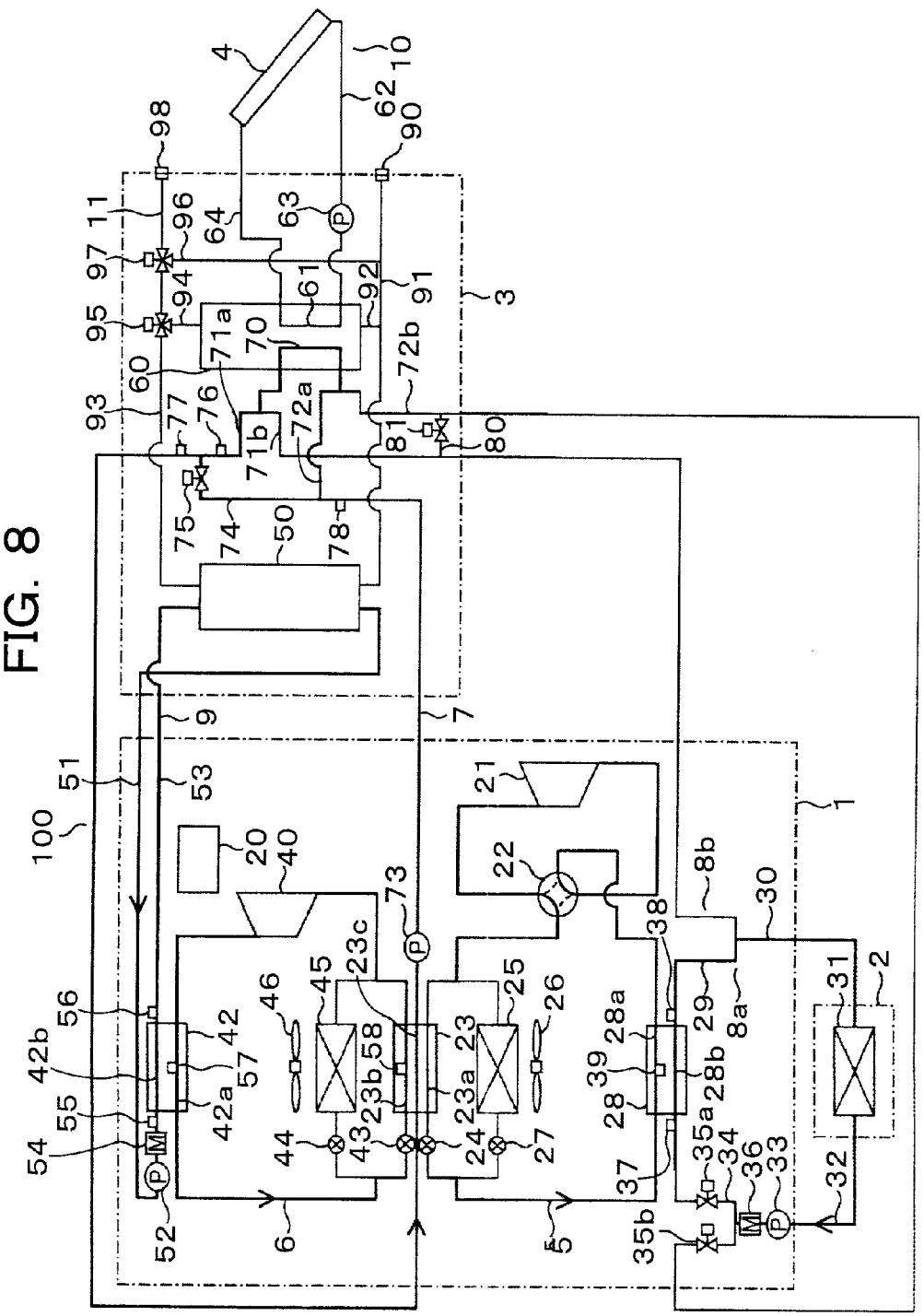
FIG. 8 is a diagram illustrating flows of refrigerants, water, and heat medium in an operation mode No. 2-2 in FIG. 2 according to the first embodiment of the present invention.

The <6> Operation mode No. 2-2 in FIG. 8 is applied when the heat source (heat absorption) for supplying hot water is smaller than the discharged heat for the cooling operation, wherein the surplus heat discharge for the cooling operation is absorbed by cold water in the heat storage tank 60. In this mode, heat is absorbed by the cold water, instead of the air in the <4> Operation mode No. 2-0b.

Here, the cold water in the heat storage tank 60 is cooled by the hot-water supplying operation in a later-described <8> Operation mode No. 3-1. For example, it is preferable that the <8> Operation mode No. 3-1 is executed at night for performing hot-water supplying operation and generating cold water, and the cold heat is utilized for the hot-water supplying operation and the cooling operation in the <6> Operation mode No. 2-2 in the middle of the day.

FIG. 8 illustrates the flows of the refrigerants, water, and heat medium. In this case, the expansion valve 27 of the air temperature adjusting refrigerant circuit 5 and the expansion valve 43 of the hot-water supplying refrigerant circuit 6 are fully closed, so that the refrigerants do not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium.

In the <6> Operation mode No. 2-2, the hot-water supplying refrigerant in the air temperature adjusting refrigerant circuit 5 releases heat. Therefore, it is necessary that the temperature of the water in the heat storage tank 60 is lower than the temperature (condensation temperature) of the hot-water supplying refrigerant.

In the air temperature adjusting refrigerant circuit 5, the gas refrigerant that is compressed by the compressor 21 to have high temperature and high pressure passes through the four-way valve 22, and flows into the air temperature adjusting refrigerant heat-transfer pipe 23a of the intermediate heat exchanger 23. The high-temperature high-pressure gas refrigerant flowing in the air temperature adjusting refrigerant heat-transfer pipe 23a is cooled by the low-temperature refrigerant flowing through the hot-water supplying heat-transfer pipe 23b and by the heat medium having low temperature and flowing through the heat medium heat-transfer pipe 23c (it is condensed and liquefied, depending upon a type of the refrigerant). The pressure of the high-pressure refrigerant is reduced by the expansion valve 24, whereby this refrigerant becomes a low-temperature low-pressure refrigerant (gas-liquid two-phase refrigerant, depending upon a type of the refrigerant). This refrigerant flows into the air temperature adjusting refrigerant heat-transfer pipe 28a of the utilization-side heat exchanger 28. The refrigerant flowing through the air temperature adjusting refrigerant heat-transfer pipe 28a is heated by the heat medium, having high temperature and flowing through the air temperature adjusting heat medium heat-transfer pipe 28b, (evaporated depending upon a type of the refrigerant), and becomes a low-pressure gas refrigerant. The low-pressure gas refrigerant passes through the four-way valve 22, and returns again to the compressor 21. In this case, the surplus heat discharge, which is not used as the heat source for the hot-water supply, in the cooling operation is absorbed by cold water.

The operation of the air temperature adjusting heat medium circuit 8a is the same as that in the above-mentioned <1> Operation mode No. 1-0.

The operation of the hot-water supplying refrigerant circuit 6 and the operation of the hot-water supplying circuit 9 are the same as those in the above-mentioned <4> Operation mode No. 2-0b.

In the heat medium circuit 7, the heat medium cooled by the second heat exchanger 70 in the heat storage tank 60 passes through the outgoing pipe 71a due to the operation of the circulation pump 73 to flow into the heat medium heat-transfer pipe 23c of the intermediate heat exchanger 23. The heat medium flowing through the heat medium heat-transfer pipe 23c is heated by the high-temperature refrigerant flowing through the air temperature adjusting refrigerant heat-transfer pipe 23a, so that the temperature thereof is increased. Then, the heat medium passes through the return pipe 72a to return again to the second heat exchanger 70 in the heat storage tank 60.

Figure 9:
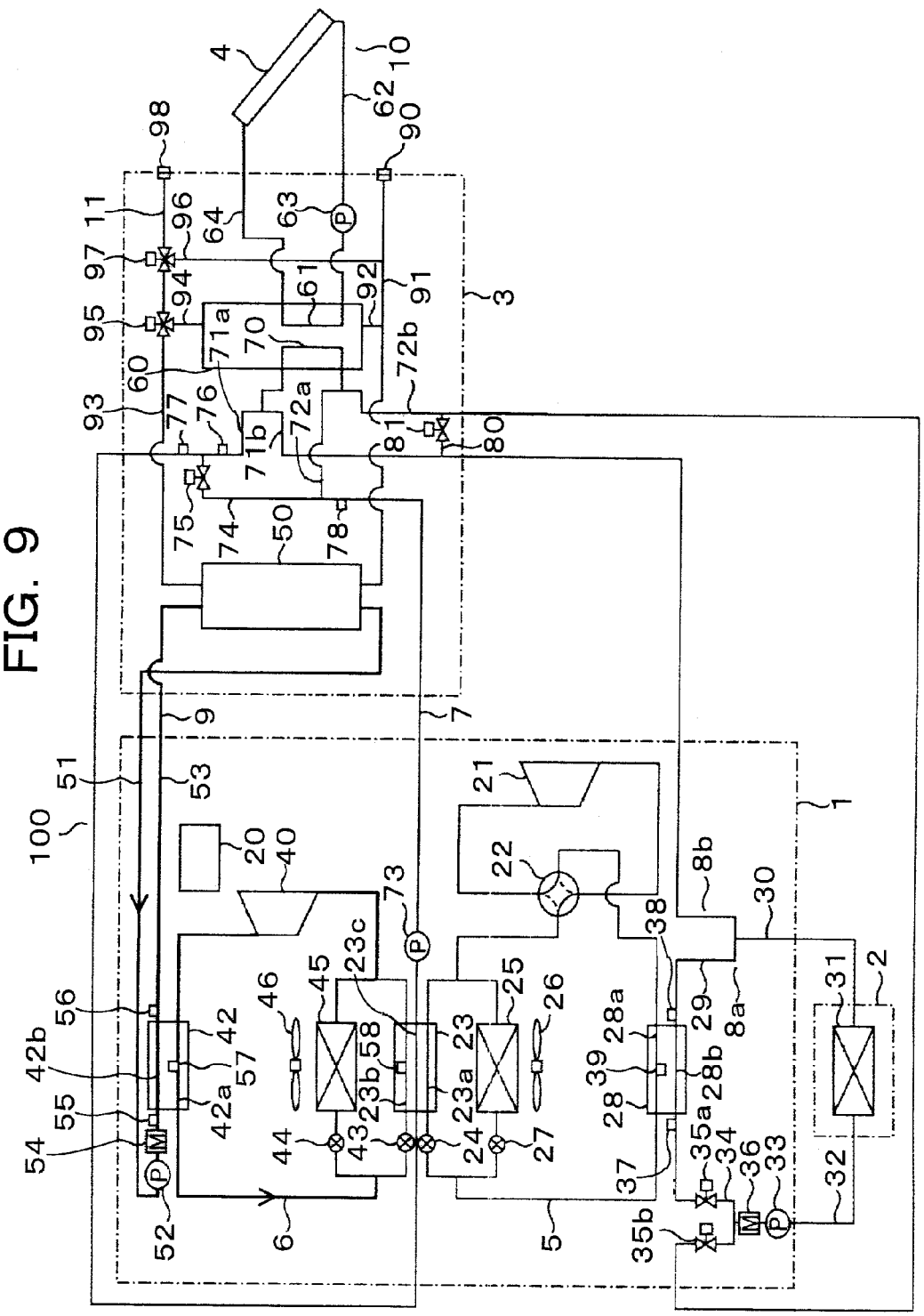
FIG. 9 is a diagram illustrating flows of a refrigerant and water in an operation mode No. 3-0 in FIG. 2 according to the first embodiment of the present invention.

The hot-water supplying operation in <7> Operation mode No. 3-0 in FIG. 9 will next be described. In this mode, heat in the air is used as the heat source for the hot-water supply. FIG. 9 illustrates the flows of the refrigerant and water. In this case, the expansion valve 43 of the hot-water supplying refrigerant circuit 6 is fully closed, so that the refrigerant does not flow. The air temperature adjusting refrigerant circuit 5, the air temperature adjusting heat medium circuits 8a and 8b, and the heat medium circuit 7 do not operate.

The operation of the hot-water supplying refrigerant circuit 6 and the operation of the hot-water supplying circuit 9 are the same as those in the above-mentioned <1> Operation mode No. 1-0.

Figure 10:
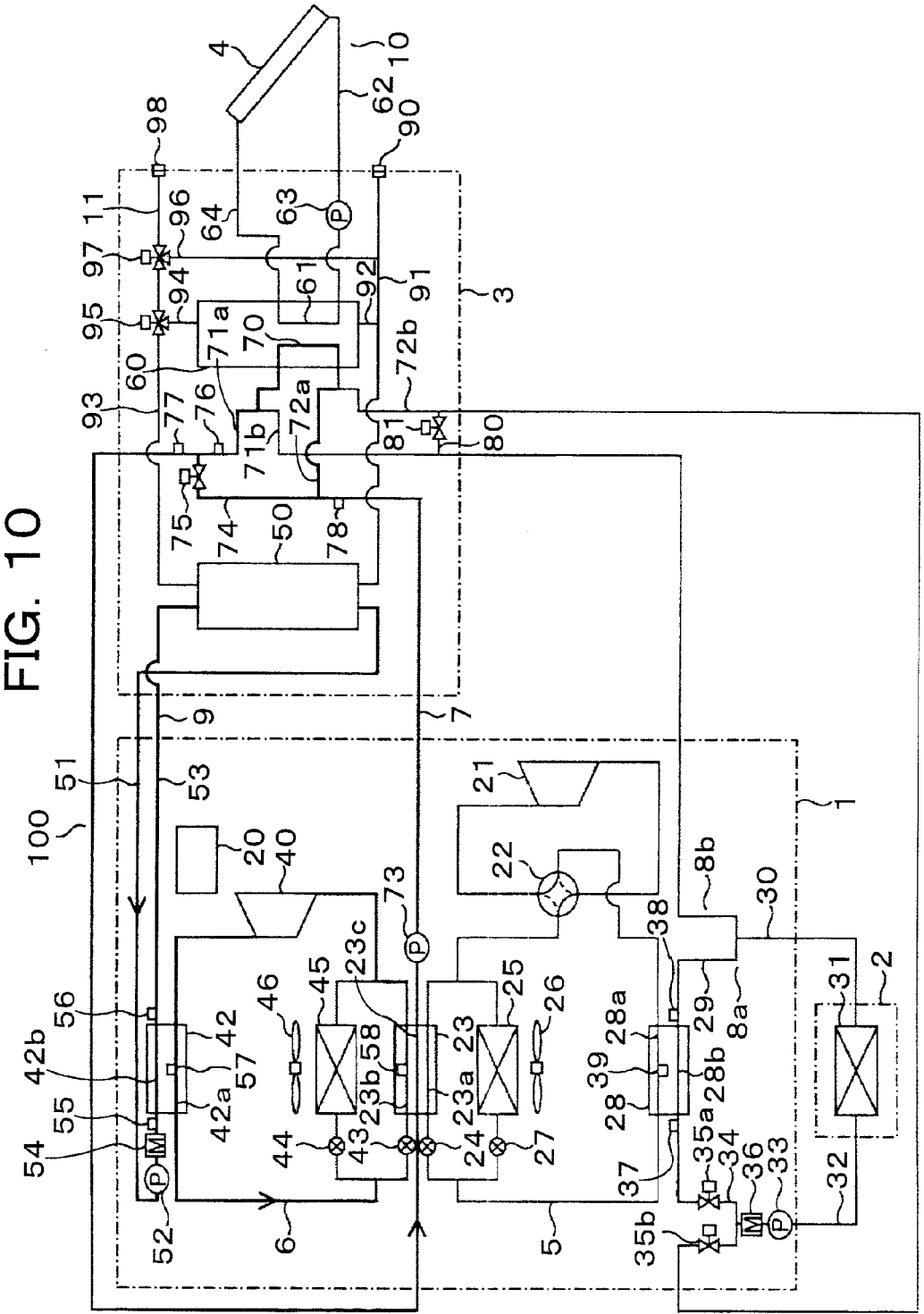
FIG. 10 is a diagram illustrating flows of a refrigerant, water, and heat medium in an operation mode No. 3-1 in FIG. 2 according to the first embodiment of the present invention.

The hot-water supplying operation in <8> Operation mode No. 3-1 in FIG. 10 will next be described. In this mode, the intermediate heat exchanger 23 functions as the evaporator for the hot-water supplying refrigerant circuit 6, wherein warm heat of the heat medium circulating in the heat medium circuit 7 is applied to the refrigerant, circulating in the hot-water supplying refrigerant circuit 6, in the intermediate heat exchanger 23, so as to execute the hot-water supplying operation.

Specifically, the hot water in the heat storage tank 60 is used as the heat source for the hot-water supplying operation. FIG. 10 illustrates the flows of the refrigerant, water, and heat medium. In this case, the expansion valve 44 of the hot-water supplying refrigerant circuit 6 is fully closed, so that the refrigerant does not flow. The air temperature adjusting refrigerant circuit 5, and the air temperature adjusting heat medium circuits 8a and 8b do not operate.

The operation of the hot-water supplying refrigerant circuit 6 and the operation of the hot-water supplying circuit 9 are the same as those in the above-mentioned <2> Operation mode No. 1-1.

Considering the energy efficiency, the hot-water supplying operation in the <8> Operation mode No. 3-1 is preferably utilized when the relationship of (temperature of heated water in hot-water supply tank 50)>(temperature of water in heat storage tank 60)>ambient temperature is established.

In the heat medium circuit 7, the heat medium heated by the second heat exchanger 70 in the heat storage tank 60 passes through the outgoing pipe 71a due to the operation of the circulation pump 73 to flow into the heat medium heat-transfer pipe 23c of the intermediate heat exchanger 23. The heat medium flowing through the heat medium heat-transfer pipe 23c is cooled by the low-temperature refrigerant flowing through the hot-water supplying refrigerant heat-transfer pipe 23b, so that the temperature thereof is reduced. Then, the heat medium passes through the return pipe 72a to return again to the second heat exchanger 70 in the heat storage tank 60. With this mode, the water in the heat storage tank 60 is cooled to become cold water.

Figure 11:
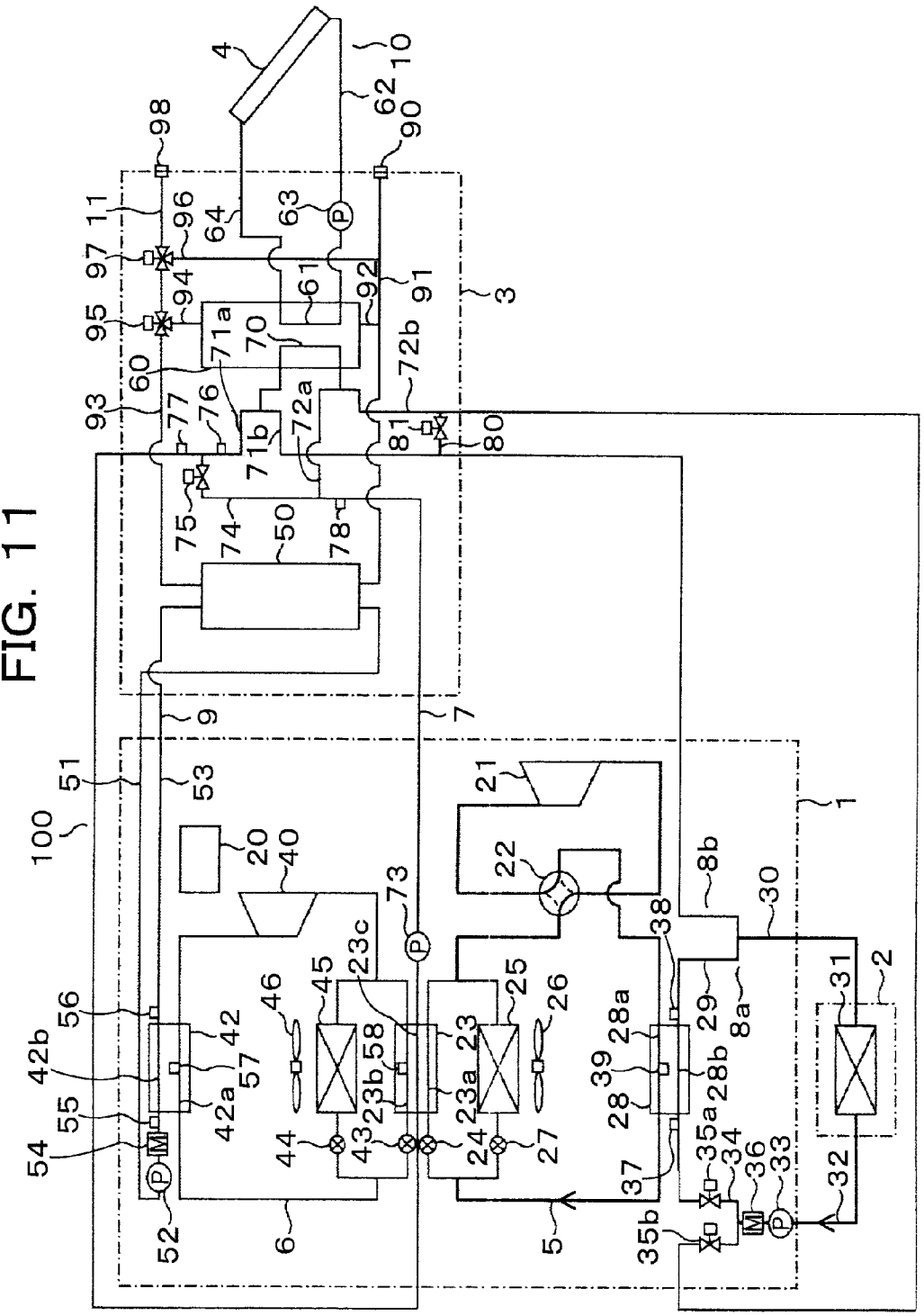
FIG. 11 is a diagram illustrating flows of refrigerants and heat medium in an operation mode No. 4-0 in FIG. 2 according to the first embodiment of the present invention.

The heating operation in <9> Operation mode No. 4-0 in FIG. 11 will next be described. In this mode, heat in the air is used as the heat source for the heating operation. FIG. 11 illustrates the flow of the refrigerant and heat medium. In this case, the expansion valve 24 of the air temperature adjusting refrigerant circuit 5 is fully closed, so that the refrigerant does not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium. The hot-water supplying refrigerant circuit 6, the hot-water supplying circuit 9, and the heat medium circuit 7 do not operate.

The operation of the air temperature adjusting refrigerant circuit 5 and the operation of the air temperature adjusting heat medium circuit 8a are the same as those in the above-mentioned <1> Operation mode No. 1-0.

Figure 12:
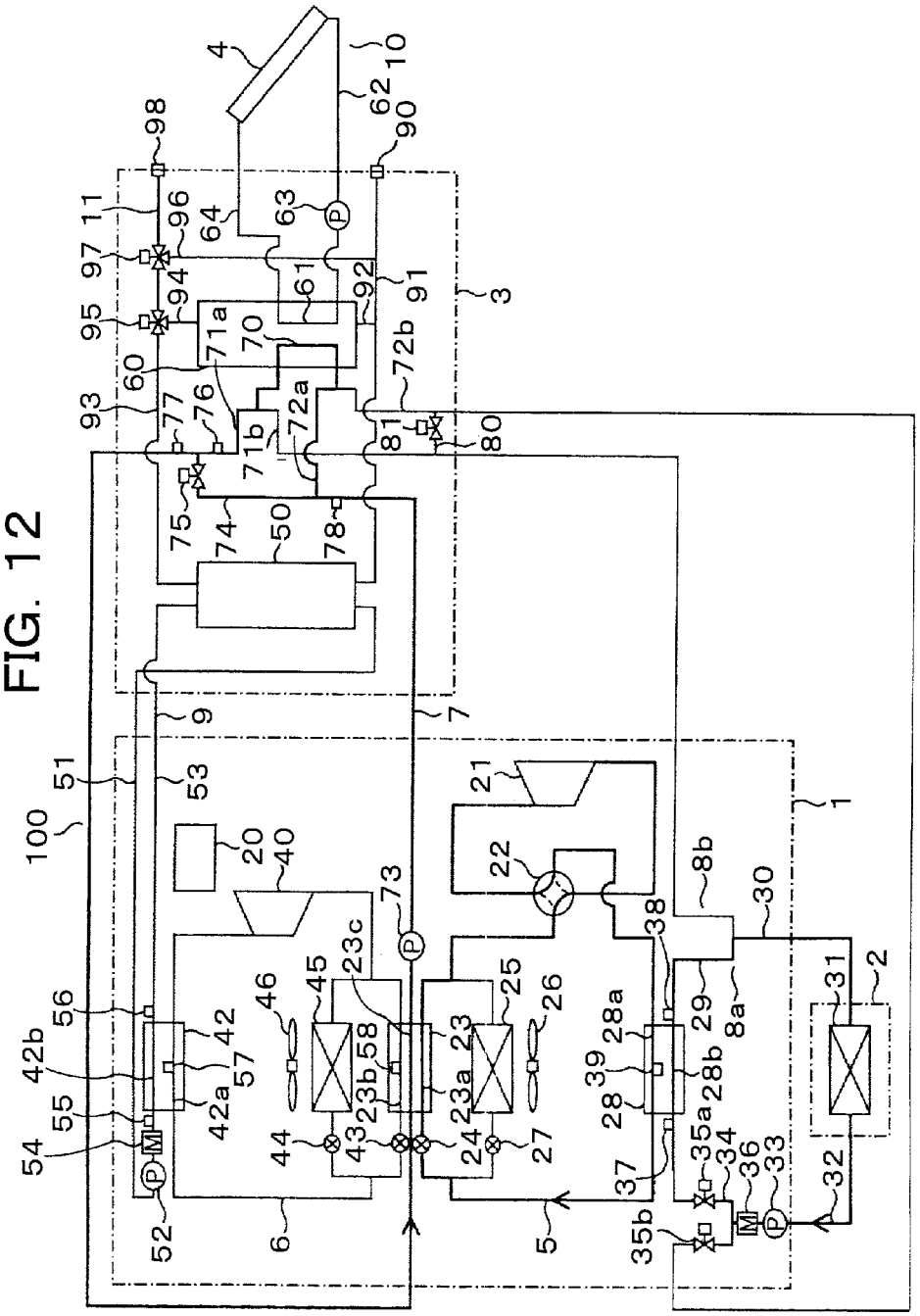
FIG. 12 is a diagram illustrating flows of a refrigerant and heat medium in an operation mode No. 4-1 in FIG. 2 according to the first embodiment of the present invention.

The heating operation in <10> Operation mode No. 4-1 in FIG. 12 will next be described. In this mode, the intermediate heat exchanger 23 functions as the evaporator for the air temperature adjusting refrigerant circuit 5, wherein warm heat of the heat medium circulating in the heat medium circuit 7 is applied to the refrigerant, circulating in the air temperature adjusting refrigerant circuit 5, in the intermediate heat exchanger 23, so as to execute the air heating operation (i.e., heating operation) by the air temperature adjusting refrigerant circuit 5.

Specifically, the hot water in the heat storage tank 60 is used as the heat source for the heating operation. FIG. 12 illustrates the flows of the refrigerant and heat medium. In this case, the expansion valve 27 of the air temperature adjusting refrigerant circuit 5 is fully closed, so that the refrigerant does not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium. The hot-water supplying refrigerant circuit 6, and the hot-water supplying circuit 9 do not operate.

The operation of the air temperature adjusting refrigerant circuit 5 and the operation of the air temperature adjusting heat medium circuit 8a are the same as those in the above-mentioned <2> Operation mode No. 1-1.

In the heat medium circuit 7, the heat medium heated by the second heat exchanger 70 in the heat storage tank 60 passes through the outgoing pipe 71a due to the operation of the circulation pump 73 to flow into the heat medium heat-transfer pipe 23c of the intermediate heat exchanger 23. The heat medium flowing through the heat medium heat-transfer pipe 23c is cooled by the low-temperature refrigerant flowing through the hot-water supplying refrigerant heat-transfer pipe 23a, so that the temperature thereof is reduced. Then, the heat medium passes through the return pipe 72a to return again to the second heat exchanger 70 in the heat storage tank 60.

Figure 13:
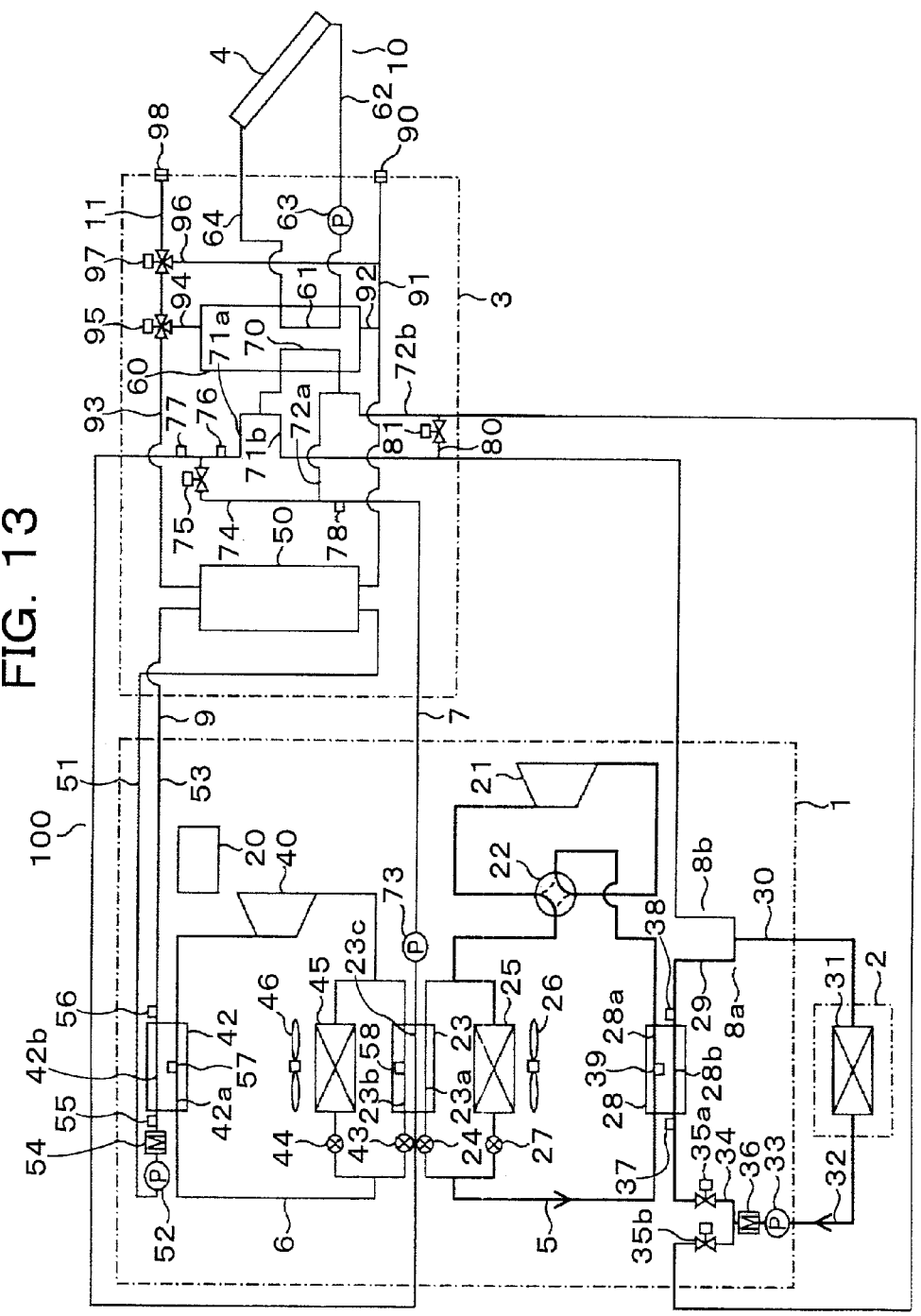
FIG. 13 is a diagram illustrating flows of a refrigerant and heat medium in an operation mode No. 5-0 in FIG. 2 according to the first embodiment of the present invention.

The cooling operation in <11> Operation mode No. 5-0 in FIG. 13 will next be described. In this mode, the heat discharge in the cooling operation is absorbed by air. FIG. 13 illustrates the flows of the refrigerant and heat medium. In this case, the expansion valve 24 of the air temperature adjusting refrigerant circuit 5 is fully closed, so that the refrigerant does not flow. The on-off valve 35a of the air temperature adjusting heat medium circuit 8a is opened to allow the heat medium to flow, while the on-off valve 35b of the air temperature adjusting heat medium circuit 8b is closed to inhibit the flow of the heat medium. The hot-water supplying refrigerant circuit 6, the hot-water supplying circuit 9, and the heat medium circuit 7 do not operate.

In the air temperature adjusting refrigerant circuit 5, the gas refrigerant that is compressed by the compressor 21 to have high temperature and high pressure passes through the four-way valve 22, and flows into the air heat exchanger 25. The high-temperature high-pressure gas refrigerant flowing into the air heat exchanger 25 is cooled by the outdoor air sent by the fan 26 (it is condensed and liquefied, depending upon a type of the refrigerant). The pressure of the high-pressure refrigerant is reduced by the expansion valve 27, whereby this refrigerant becomes a low-temperature low-pressure refrigerant (gas-liquid two-phase refrigerant, depending upon a type of the refrigerant). This refrigerant flows into the air temperature adjusting refrigerant heat-transfer pipe 28a of the utilization-side heat exchanger 28, is heated by the heat medium, having high temperature and flowing through the air temperature adjusting heat medium heat-transfer pipe 28b, (evaporated depending upon a type of the refrigerant), and becomes a low-pressure gas refrigerant. The low-pressure gas refrigerant passes through the four-way valve 22, and returns again to the compressor 21.

The operation of the air temperature adjusting heat medium circuit 8a is the same as that in the above-mentioned <3> Operation mode No. 2-0a.

The cooling operation in <12> Operation mode No. 5-1 in FIG. 14 will next be described. In this mode, the intermediate heat exchanger 23 functions as the condenser for the air temperature adjusting refrigerant circuit 5, wherein cold heat of the heat medium circulating in the heat medium circuit 7 is applied to the refrigerant, circulating in the air temperature adjusting refrigerant circuit 5, in the intermediate heat exchanger 23, so as to execute the air cooling operation (i.e., cooling operation) by the air temperature adjusting refrigerant circuit 5.

Specifically, the discharged heat in the cooling operation is absorbed by the cold water in the heat storage tank 60. Here, the cold water in the heat storage tank 60 is cooled by the hot-water supplying operation in the above-mentioned <8> Operation mode No. 3-1. The cold heat generated in the hot-water supplying operation is used as a cold heat source during the cooling operation with a time lag. Specifically, it is preferable that the <8> Operation mode No. 3-1 is executed at night for supplying hot water and generating cold water, and the cold heat is utilized for the cooling operation in the <12> Operation mode No. 5-1 in the middle of the day, for example.

Figure 14:
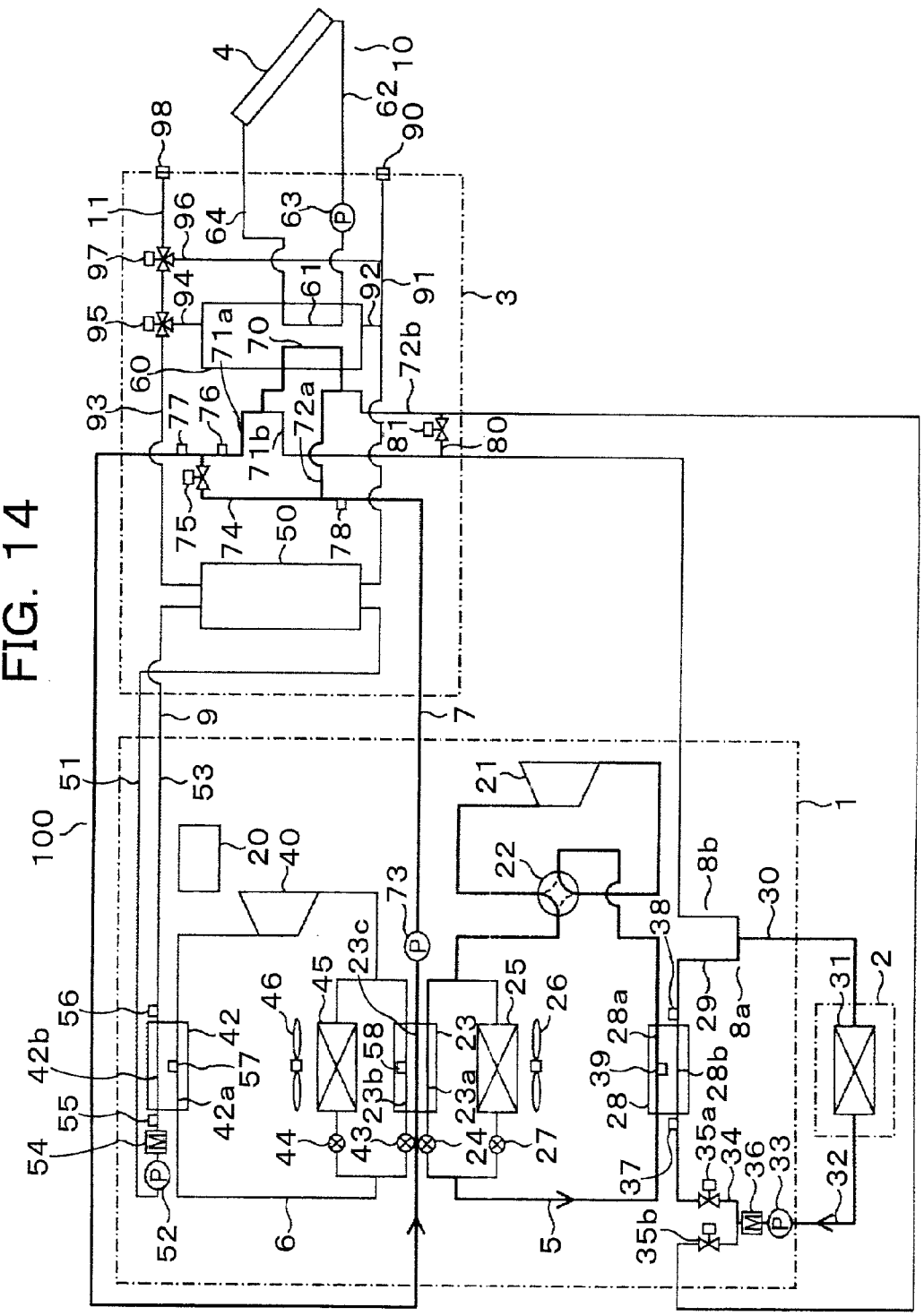
FIG. 14 is a diagram illustrating flows of a refrigerant and heat medium in an operation mode No. 5-1 in FIG. 2 according to the first embodiment of the present invention.

FIG. 14 illustrates the flows of the refrigerant and heat medium. In this case, the expansion valve 27 of the air temperature adjusting refrigerant circuit 5 is fully closed, so that the refrigerant does not flow. The hot-water supplying refrigerant circuit 6, and the hot-water supplying circuit 9 do not operate.

In the air temperature adjusting refrigerant circuit 5, the gas refrigerant that is compressed by the compressor 21 to have high temperature and high pressure passes through the four-way valve 22, and flows into the air temperature adjusting refrigerant heat-transfer pipe 23a of the intermediate heat exchanger 23. The high-temperature high-pressure gas refrigerant flowing in the air temperature adjusting refrigerant heat-transfer pipe 23a is cooled by the low-temperature heat medium flowing through the heat medium heat-transfer pipe 23c (it is condensed and liquefied, depending upon a type of the refrigerant). The pressure of the high-pressure refrigerant is reduced by the expansion valve 24, whereby this refrigerant becomes a low-temperature low-pressure refrigerant (gas-liquid two-phase refrigerant, depending upon a type of the refrigerant). This refrigerant flows into the air temperature adjusting refrigerant heat-transfer pipe 28a of the utilization-side heat exchanger 28, is heated by the heat medium, having high temperature and flowing through the air temperature adjusting heat medium heat-transfer pipe 28b, (evaporated depending upon a type of the refrigerant), and becomes a low-pressure gas refrigerant. The low-pressure gas refrigerant passes through the four-way valve 22, and returns again to the compressor 21.

The operation of the air temperature adjusting heat medium circuit 8a is the same as that in the above-mentioned <3> Operation mode No. 2-0a.

In the heat medium circuit 7, the heat medium cooled by the second heat exchanger 70 in the heat storage tank 60 passes through the outgoing pipe 71*a* due to the operation of the circulation pump 73 to flow into the heat medium heat-transfer pipe 23*c* of the intermediate heat exchanger 23. The heat medium flowing through the heat medium heat-transfer pipe 23*c* is heated by the high-temperature refrigerant flowing through the air temperature adjusting refrigerant heat-transfer pipe 23*a*, so that the temperature thereof is increased. Then, the heat medium passes through the return pipe 72*a* to return again to the second heat exchanger 70 in the heat storage tank 60.

As described above, according to the configuration above, the heat medium circuit can store heat (warm heat or cold heat) of the refrigerants circulating in the air temperature adjusting refrigerant circuit and the hot-water supplying refrigerant circuit. Therefore, the discharged heat of the air temperature adjusting refrigerant circuit and the hot-water supplying refrigerant circuit can effectively be used not only in the case where the respective circuits are simultaneously operated but also in the case where the respective circuits are operated at different times, whereby high energy efficiency can be attained.

The warm heat obtained by the solar heat collector can be utilized as the heat source for the hot-water supply and air-conditioning, whereby high energy efficiency can be attained. The present invention can cut annual power consumption by about 40% according to the estimation by calculation.

When the hot-water supplying operation is only executed, the air temperature adjusting refrigerant circuit does not operate, and only the hot-water supplying refrigerant circuit may be operated. Therefore, unnecessary energy consumption can be reduced.

Even when the quantity of absorbed heat during the hot-water supply is larger than the quantity of the discharged heat during the cooling operation upon the hot-water supplying operation and the cooling operation, the heat in the air can be utilized by the air heat exchanger in the hot-water supplying refrigerant circuit. Therefore, the operation is possible, no matter which is larger, the absorbed heat during the hot-water supply or the quantity of discharged heat during the cooling operation.

The intermediate heat exchanger is a three-fluid heat exchanger configured such that the air temperature adjusting refrigerant heat-transfer pipe, the hot-water supplying refrigerant heat-transfer pipe, and the heat medium heat-transfer pipe are integrally formed to be brought into contact with one another. Accordingly, the number of the heat exchangers can be reduced, compared to the configuration including a two-fluid heat exchanger between the air temperature adjusting refrigerant heat-transfer pipe and the hot-water supplying refrigerant heat-transfer pipe, a two-fluid heat exchanger between the hot-water supplying refrigerant heat-transfer pipe and the heat medium heat-transfer pipe, and a two-fluid heat exchanger between the air temperature adjusting refrigerant heat-transfer pipe and the heat medium heat-transfer pipe, whereby cost and capacity of the system can be reduced.

The present invention includes plural operation modes capable of effectively utilizing the discharged warm/cold heat of the refrigerant circuit and the warm/cold heat source such as a solar heat, whereby high energy efficiency can be attained.

A control in the mode for the hot-water supplying operation and the cooling operation will next be described. In this mode, when the air cooling operation by the air temperature adjusting refrigerant circuit 5 and the hot-water supplying operation by the hot-water supplying refrigerant circuit 6 are executed, the air temperature adjusting refrigerant circuit and the hot-water supplying refrigerant circuit are controlled such that a target evaporation temperature of the hot-water supplying refrigerant circuit 6 or a target condensation temperature of the air temperature adjusting refrigerant circuit 5 is attained, the target evaporation temperature or the target condensation temperature being set based upon an air cooling capacity and the evaporation temperature of the air temperature adjusting refrigerant circuit 5 and a hot-water supplying capacity and the condensation temperature of the hot-water supplying refrigerant circuit 6.

In this case, the target evaporation temperature of the hot-water supplying refrigerant circuit 6 or the target condensation temperature of the air temperature adjusting refrigerant circuit 5 are set such that the efficiency of the air cooling operation by the air temperature adjusting refrigerant circuit 5 and the hot-water supplying operation by the hot-water supplying refrigerant circuit 6 become the highest.

In this mode, as the ratio of the hot-water supplying capacity to the air cooling capacity is greater, the target evaporation temperature of the hot-water supplying refrigerant circuit 6 or the target condensation temperature of the air temperature adjusting refrigerant circuit 5 is set to be higher.

Specific examples of this mode include the <5> Operation mode No. 2-1 and the <6> Operation mode No. 2-2 utilizing the heat medium.

Specifically, in this mode, when the air cooling operation by the air temperature adjusting refrigerant circuit 5 and the hot-water supplying operation by the hot-water supplying refrigerant circuit 6 are executed, the air temperature adjusting refrigerant circuit 5, the hot-water supplying refrigerant circuit 6, and the heat medium circuit 7 are controlled such that a target evaporation temperature of the hot-water supplying refrigerant circuit 6 or a target condensation temperature of the air temperature adjusting refrigerant circuit 5 is attained, the target evaporation temperature or the target condensation temperature being set based upon an air cooling capacity and the evaporation temperature of the air temperature adjusting refrigerant circuit 5 and a hot-water supplying capacity and the condensation temperature of the hot-water supplying refrigerant circuit 6.

This mode will be described in detail below. The control of the evaporation temperature of the hot-water supplying refrigerant circuit 6 during the hot-water supplying operation and cooling operation in the <5> Operation mode No. 2-1 in FIG. 7 will be described with reference to FIGS. 7, and 15 to 18. This operation mode is applied when the heat source (heat absorption) for supplying hot water is larger than the discharged heat in the cooling operation, wherein the discharged heat during the cooling operation and the hot water in the heat storage tank 60 are used as the heat source for supplying hot water.

A control device 20 controls the rotation speed of the compressor 21 in such a manner that the temperature of the temperature sensor 38 at the outlet of the heat medium of the utilization-side heat exchanger 28 in the air temperature adjusting refrigerant circuit 5 becomes a predetermined target value. The target value of the temperature at the outlet of the heat medium is set based upon a cooling load in a room where temperature is to be controlled. In this case, the case in which the temperature of the temperature sensor 38 at the outlet of the heat medium is higher than the target value means poor capacity, so that the control device 20 increases the rotation speed of the compressor. The case where it is lower than the target value means excess capacity, so that the control device 20 decreases the rotation speed of the compressor. When it is equal to the target value, the control device 20 keeps the rotation speed of the compressor. The control device 20 also controls the rotation speed of the compressor 40 in such a manner that the temperature of the temperature sensor 56 at the outlet of water of the utilization-side heat exchanger 42 in the hot-water supplying refrigerant circuit 6 becomes a predetermined target value. The target value of the temperature at the outlet of water is set based upon daily hot-water supply load. The case in which the temperature of the temperature sensor 56 at the outlet of the water is lower than the target value means poor capacity, so that the control device 20 increases the rotation speed of the compressor. The case where it is higher than the target value means excess capacity, so that the control device 20 decreases the rotation speed of the compressor. When it is equal to the target value, the control device 20 keeps the rotation speed of the compressor.

A process of setting a target value Th-e0 of the evaporation temperature of the refrigerant flowing through the hot-water supplying refrigerant heat-transfer pipe 23*b* of the intermediate heat exchanger 23 in the hot-water supplying refrigerant circuit 6 will be described with reference to a flowchart in FIG. 15. In step S11, the control device 20 detects an evaporation temperature Tl-e of the air temperature adjusting refrigerant circuit 5 by the temperature sensor 39, which is arranged on the refrigerant heat-transfer pipe 28*a* of the utilization-side heat exchanger 28 in the air temperature adjusting refrigerant circuit 5, and detects a condensation temperature Th-c of the hot-water supplying refrigerant circuit 6 by the temperature sensor 57 arranged on the refrigerant heat-transfer pipe 42*a* of the utilization-side heat exchanger 42 in the hot-water supplying refrigerant circuit 6. In step S12, the control device 20 detects the temperature at the inlet of the heat medium by the temperature sensor 37 arranged at the inlet of the heat medium of the air temperature adjusting heat medium heat-transfer pipe 28*b* of the utilization-side heat exchanger 28 in the air temperature adjusting refrigerant circuit 5, detects the temperature at the outlet of the heat medium by the temperature sensor 38 arranged at the outlet of the heat medium, and detects the flow rate of the heat medium by the flow rate sensor 36 arranged on the return pipe 32. In step S13, the control device 20 detects the temperature of the inlet of water by the temperature sensor 55 arranged at the inlet of water of the hot-water supplying water heat-transfer pipe 42*b* of the utilization-side heat exchanger 42 in the hot-water supplying refrigerant circuit 6, detects the temperature of the outlet of water by the temperature sensor 56 arranged at the outlet of water, and detects a flow rate of water by the flow rate sensor 54 arranged on the outgoing pipe 51.

In step S14, the control device 20 calculates a cooling capacity Ql and hot-water supplying capacity Qh from the temperatures and flow rates detected in step S12 and step S13. The cooling capacity Ql is calculated from a product of a specific heat and density of the heat medium, which are stored in advance, the detected flow rate of the heat medium, and the difference between the temperature at the inlet and the temperature at the outlet of the heat medium. The hot-water supplying capacity Qh is calculated from a product of a specific heat and density of water, which are stored in advance, the detected flow rate of water, and the difference between the temperature at the inlet and the temperature at the outlet of water.

Figure 15:
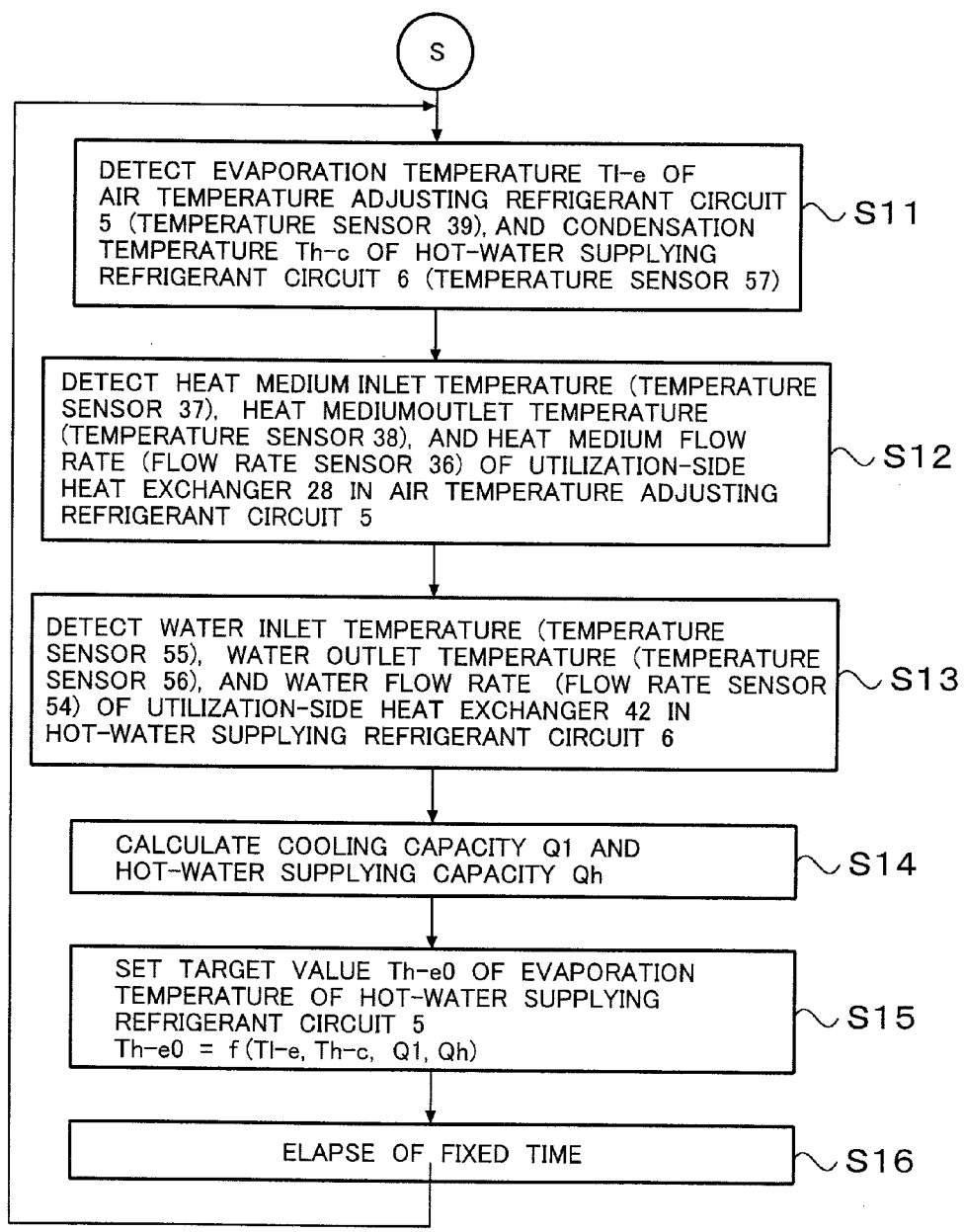
FIG. 15 is a flowchart illustrating a process of setting a target evaporation temperature of a hot-water supplying refrigerant circuit according to the first embodiment of the present invention.

In step S15, the control device 20 sets a target value Th-e0 of the evaporation temperature of the refrigerant flowing through the hot-water supplying refrigerant heat-transfer pipe 23*b* of the intermediate heat exchanger 23 in the hot-water supplying refrigerant circuit 6 based upon the evaporation temperature Tl-e of the air temperature adjusting refrigerant circuit 5 and the condensation temperature Th-c of the hot-water supplying refrigerant circuit 6, which are detected in step S11, and the cooling capacity Ql and the hot-water supplying capacity Qh, which are calculated in step S14. f in step S15 in FIG. 15 indicates a function. The specific action of the function f will be described with reference to FIGS. 16 and 17. The control device 20 firstly selects a slope A and an intercept B of a primary expression involved with ((hot-water supplying capacity Qh)/(cooling capacity Ql+hot-water supplying capacity Qh)), which indicates the target value Th-e0 of the evaporation temperature of the hot-water supplying refrigerant circuit 6 corresponding to the evaporation temperature Tl-e of the air temperature adjusting refrigerant circuit 5 and the condensation temperature Th-c of the hot-water supplying refrigerant circuit 6, with the use of a table that is set beforehand and illustrated in FIG. 16. The primary expression is expressed as follows.

$$Th\text{-}e0 = A \times Qh/(Ql+Qh) + B \qquad \text{Equation 1}$$

Figure 17:
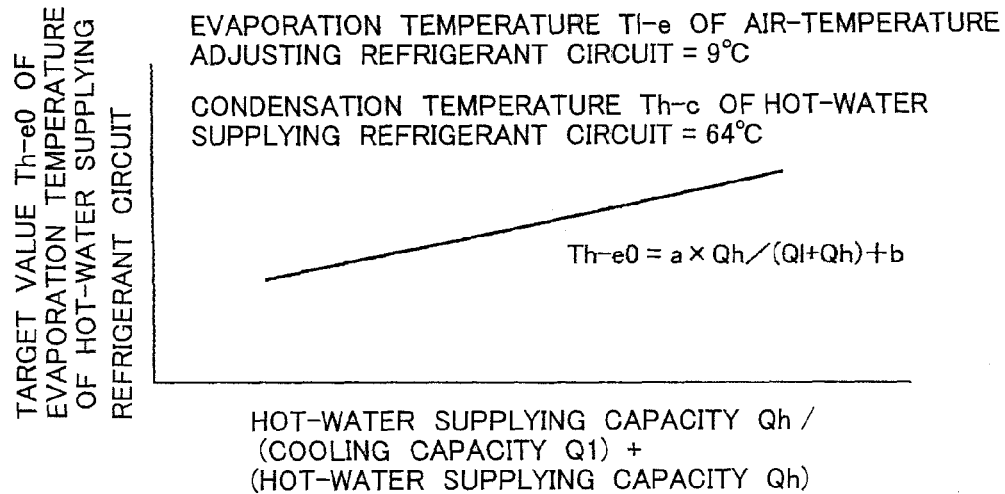
FIG. 17 is a view illustrating a relationship between (hot-water storing capacity/(cooling capacity+hot-water storing capacity) and the target evaporation temperature of the hot-water supplying refrigerant circuit according to the first embodiment of the present invention.

The table in FIG. 16 applies the slope A and the intercept B for each range of the evaporation temperature Tl-e of the air temperature adjusting refrigerant circuit and the condensation temperature Th-c of the hot-water supplying refrigerant circuit. For example, when the evaporation temperature Tl-e of the air temperature adjusting refrigerant circuit 5 is 9° C., and the condensation temperature Th-c of the hot-water supplying refrigerant circuit 6 is 64° C., the slope A is a, and the intercept B is b. The relationship between the ((hot-water supplying capacity Qh)/(cooling capacity Ql+hot-water supplying capacity Qh)) and the target value Th-e0 of the evaporation temperature of the hot-water supplying refrigerant circuit in this case is as illustrated in FIG. 17. The relationship between the ((hot-water supplying capacity Qh)/(cooling capacity Ql+hot-water supplying capacity Qh)) and the target value Th-e0 of the evaporation temperature of the hot-water supplying refrigerant circuit is set such that, as the ratio of the hot-water supplying capacity Qh to the (cooling capacity Ql+hot-water supplying capacity Qh) is larger, the target value Th-e0 of the evaporation temperature of the hot-water supplying refrigerant circuit 6 becomes higher, regardless of the evaporation temperature Tl-e of the air temperature adjusting refrigerant circuit and the condensation temperature Th-c of the hot-water supplying refrigerant circuit.

The reason why the target value Th-e0 of the evaporation temperature of the hot-water supplying refrigerant circuit 6 is set to be higher, as the ratio of the hot-water supplying capacity Qh to the (cooling capacity Ql+hot-water supplying capacity Qh) is larger, will be described below.

Figure 18:
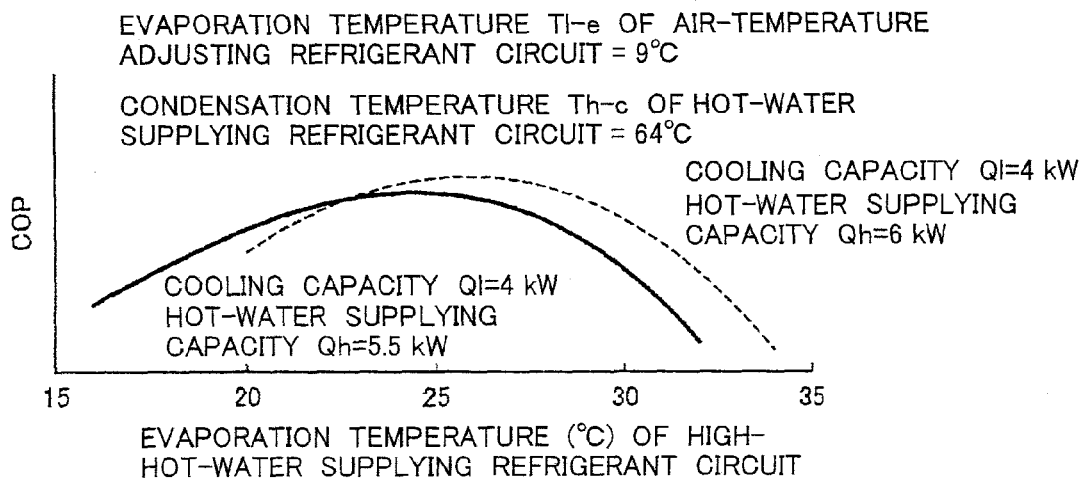
FIG. 18 is a view illustrating a relationship between the evaporation temperature of the hot-water supplying refrigerant circuit and a COP according to the first embodiment of the present invention.

FIG. 18 illustrates the relationship between the evaporation temperature of the hot-water supplying refrigerant circuit 6 and COP ((cooling capacity+hot-water supplying capacity)/power consumption) indicating the energy efficiency of the air-conditioning hot-water supply system 100, for each of the operation conditions in which the cooling capacity Ql is 4 kW and the hot-water supplying capacity Qh is 5.5 kW, and in which the cooling capacity Ql is the same, 4 kW and the hot-water supplying capacity Qh is 6 kW, when the evaporation temperature Tl-e of the air temperature adjusting refrigerant circuit 5 is 9° C., and the condensation temperature Th-c of the hot-water supplying refrigerant circuit 6 is 64° C. From the drawing it is found that the evaporation temperature of the hot-water supplying refrigerant circuit 6 at which the COP is the highest is present under each operation condition. The evaporation temperature at which the COP becomes the highest is higher in case where the hot-water supplying capacity is 6 kW than in case where the hot-water supplying capacity is 5.5 kW. Accordingly, the energy efficiency of the air-conditioning hot-water supply system 100 can be kept high by the operation condition in which the target value of the evaporation temperature of the hot-water supplying refrigerant circuit 6 is set as the evaporation temperature at which the COP becomes the highest, and the evaporation temperature is controlled.

The reason why the evaporation temperature of the hot-water supplying refrigerant circuit 6 at which the COP becomes the highest increases as the ratio of the hot-water supplying capacity Qh to the (cooling capacity Ql+hot-water supplying capacity Qh) is larger will be described below.

In the intermediate heat exchanger 23 during the hot-water supplying operation and the cooling operation in the <5> Operation mode No. 2-1, the refrigerant that is currently condensed in the refrigerant heat-transfer pipe 23a of the air temperature adjusting refrigerant circuit 5 and the heat medium in the heat medium heat-transfer pipe 23c perform heat exchange with the refrigerant that is currently evaporated in the refrigerant heat-transfer pipe 23b of the hot-water supplying refrigerant circuit 6. In this case, when the evaporation temperature of the hot-water supplying refrigerant circuit 6 increases, the condensation temperature of the air temperature adjusting refrigerant circuit 5 also increases. On the contrary, when the evaporation temperature of the hot-water supplying refrigerant circuit 6 decreases, the condensation temperature of the air temperature adjusting refrigerant circuit 5 also decreases. In other words, the evaporation temperature of the hot-water supplying refrigerant circuit 6 and the condensation temperature of the air temperature adjusting refrigerant circuit 5 simultaneously change. As the evaporation temperature of the hot-water supplying refrigerant circuit 6 increases, the temperature difference between the evaporation and condensation of the hot-water supplying refrigerant circuit 6 decreases, so that the power consumption of the compressor 40 is reduced from the property of the refrigerating cycle. On the other hand, the condensation temperature of the air temperature adjusting refrigerant circuit 5 also increases in this case, so that the temperature difference between the evaporation and condensation of the air temperature adjusting refrigerant circuit 5 increases. Therefore, the power consumption of the compressor 21 increases from the property of the refrigerating cycle. When the evaporation temperature of the hot-water supplying refrigerant circuit 6 decreases, the operation reverse to the above-mentioned operation is executed.

The total power consumption of the air-conditioning hot-water supply system 100 is greatly occupied by the power consumption of the compressor 21 of the air temperature adjusting refrigerant circuit 5 and the power consumptions of the compressor 40 of the hot-water supplying refrigerant circuit 6. Accordingly, in order to keep the COP of the air-conditioning hot-water supply system 100 high, the power consumptions of the compressors 21 and 40 have to be reduced. The case in which the ratio of the hot-water supplying capacity Qh to the (cooling capacity Ql+hot-water supplying capacity Qh) is large indicates that the ratio of the power consumption of the compressor 40 in the hot-water supplying refrigerant circuit 6 is large in the total power consumption. Accordingly, when the evaporation temperature of the hot-water supplying refrigerant circuit 6 increases in order that the power consumption of the compressor 40 of the hot-water supplying refrigerant circuit 6 decreases as the ratio of the hot-water supplying capacity Qh to the (cooling capacity Ql+hot-water supplying capacity Qh) is larger, the COP can be kept high.

Increasing the evaporation temperature of the hot-water supplying refrigerant circuit 6 means the increase in the condensation temperature of the air temperature adjusting refrigerant circuit 5. Since the evaporation temperature of the hot-water supplying refrigerant circuit 6 increases, the power consumption of the compressor 40 is reduced, and since the condensation temperature of the air temperature adjusting refrigerant circuit 5 increases, the power consumption of the compressor 21 is increased.

Since the power consumption of the compressor 40 is relatively larger than the power consumption of the compressor 21, the total power consumption can be reduced by reducing the power consumption of the compressor 40, although the power consumption of the compressor 21 is increased. Therefore, the evaporation temperature of the hot-water supplying refrigerant circuit 6 is increased in the above operation.

It is understood from the above description that the target value Th-e0 of the evaporation temperature of the hot-water supplying refrigerant circuit 6 is set from the evaporation temperature Tl-e of the air temperature adjusting refrigerant circuit 5, the condensation temperature Th-c of the hot-water supplying refrigerant circuit 6, the cooling capacity Ql, and the hot-water supplying capacity Qh in step S15. The target value is set such that the COP becomes the highest.

After step S15, the control device 20 returns again to step S11 to repeat these processes after a fixed time has elapsed (step S16).

The evaporation temperature of the hot-water supplying refrigerant circuit 6 is controlled by adjusting the temperature of the heat medium going to the heat medium heat-transfer pipe 23c of the intermediate heat exchanger 23. In the intermediate heat exchanger 23, the refrigerant, which is currently evaporated and which flows through the refrigerant heat-transfer pipe 23b of the hot-water supplying refrigerant circuit 6, absorbs heat from the refrigerant, which is currently condensed and which flows through the refrigerant heat-transfer pipe 23a of the air temperature adjusting refrigerant circuit 5, and further, absorbs heat from the heat medium flowing through the heat medium heat-transfer pipe 23c.

When the evaporation temperature of the hot-water supplying refrigerant circuit 6 is higher than the target value Th-e0, the control device 20 controls to open the bypass valve 75, based upon the value of the temperature sensor 76 that detects the temperature of the heat medium from the in-tank heat exchanger 70, and the value of the temperature sensor 78 that detects the return temperature of the heat medium, whose temperature is decreased, from the intermediate heat exchanger 23, in such a manner that the target value of the temperature sensor 77, in the heat medium circuit 7, for the outgoing temperature of the heat medium is decreased to set the temperature of the temperature sensor 77 for the outgoing temperature as the target value. With this process, the mixing amount of the returning heat medium, having the decreased temperature, is increased, so that the temperature of the outgoing heat medium is decreased. On the other hand, when the evaporation temperature of the hot-water supplying refrigerant circuit 6 is lower than the target value Th-e0, the control device 20 controls to close the bypass valve 75 in order that the target temperature of the temperature sensor 77 for the outgoing temperature of the heat medium is increased to set the temperature of the temperature sensor 77 for the outgoing temperature as the target value. With this process, the mixing amount of the returning heat medium, having the decreased temperature, is decreased, so that the temperature of the outgoing heat medium is increased.

With the temperature change of the outgoing heat medium, the evaporation temperature of the hot-water supplying refrigerant circuit 6 and the condensation temperature of the air temperature adjusting refrigerant circuit 5 change in order to have a balanced heat budget in the intermediate heat exchanger 23, whereby the evaporation temperature of the hot-water supplying refrigerant circuit 6 becomes the target value Th-e0.

According to the control described above, the evaporation temperature of the hot-water supplying refrigerant circuit 6 during the hot-water supplying operation and cooling operation is set to have the highest energy efficiency, whereby the energy efficiency of the air-conditioning hot-water supply system 100 can be kept high.

In the embodiment, the evaporation temperature of the hot-water supplying refrigerant circuit 6 is set as the control target value. However, the same effect can be obtained, even if the condensation temperature of the air temperature adjusting refrigerant circuit 5 is set as the control target value.

The same control can be executed even when the hot-water supplying operation and cooling operation in the <6> Operation mode No. 2-2 in FIG. 8 are executed, i.e., even when the heat source (heat absorption) for supplying hot water is smaller than the discharged heat during the cooling operation, and the surplus discharged heat in the cooling operation is absorbed by the cold water in the heat storage tank 60. Specifically, the temperature of the heat medium outgoing to the intermediate heat exchanger 23 is adjusted and controlled in order that the target evaporation temperature of the hot-water supplying refrigerant circuit 6 or the target condensation temperature of the air temperature adjusting refrigerant circuit 5, which is set beforehand so as to have the highest energy efficiency, is attained. With this process, the energy efficiency of the air-conditioning hot-water supply system 100 can be kept high.

Specific examples of the control in the mode of the hot-water supplying operation and cooling operation include the <3> Operation mode No. 2-0a and <4> Operation mode No. 2-0b utilizing heat in the air.

Specifically, in this mode, the rotation speed of the fan 26 of the air heat exchanger 25 and the rotation speed of the fan 46 of the air heat exchanger 45 are controlled in such a manner that the target evaporation temperature of the hot-water supplying refrigerant circuit 6 or the target condensation temperature of the air temperature adjusting refrigerant circuit 5 is attained, wherein the target evaporation temperature or the target condensation temperature is set based upon the air cooling capacity and the evaporation temperature of the air temperature adjusting refrigerant circuit 5 and the hot-water supplying capacity and the condensation temperature of the hot-water supplying refrigerant circuit 6.

This operation will be described in detail below. The hot-water supplying operation and cooling operation in the <3> Operation mode No. 2-0a in FIG. 5 will be described, in other words, the case in which the heat source (absorption heat) for supplying hot water is larger than the discharged heat in the cooling operation, and the discharged heat in the cooling operation and heat in the air are employed as the heat source for supplying hot water. In this case, the process up to the process of setting the target value of the evaporation temperature of the refrigerant flowing through the hot-water supplying refrigerant heat-transfer pipe 23b of the intermediate heat exchanger 23 in the hot-water supplying refrigerant circuit 6 is the same as the process, which has already been illustrated in FIG. 15 for the <5> Operation mode No. 2-1, and the method of controlling the evaporation temperature is different.

As illustrated in FIG. 5, in the intermediate heat exchanger 23, the refrigerant that flows through the refrigerant heat-transfer pipe 23b of the hot-water supplying refrigerant circuit 6 and that is currently evaporated absorbs heat from the refrigerant that flows through the refrigerant heat-transfer pipe 23a of the air temperature adjusting refrigerant circuit 5 and that is currently condensed, and further, the refrigerant that flows through the air heat exchanger 45 arranged parallel to the intermediate heat exchanger 23 and that is currently evaporated absorbs heat from the outdoor air sent by the fan 46.

In this case, when the rotation speed of the fan 46 is reduced, the heat-transfer coefficient of the air in the air heat exchanger 45 decreases, so that the temperature difference between the air and the refrigerant increases. Therefore, the evaporation temperature of the refrigerant flowing through the air heat exchanger 45 decreases, whereby the evaporation temperature of the refrigerant flowing through the refrigerant heat-transfer pipe 23b of the intermediate heat exchanger 23 arranged parallel to the air heat exchanger 45 also decreases. On the other hand, when the rotation speed of the fan 46 increases, the heat-transfer coefficient of the air enhances in the air heat exchanger 45, so that the temperature difference between the air and the refrigerant decreases. Therefore, the evaporation temperature of the refrigerant flowing through the air heat exchanger 45 increases, whereby the evaporation temperature of the refrigerant flowing through the refrigerant heat-transfer pipe 23b of the intermediate heat exchanger 23 arranged parallel to the air heat exchanger 45 also increases. By utilizing this relationship, the rotation speed of the fan 46 is decreased, when the evaporation temperature of the hot-water supplying refrigerant circuit 6 is higher than the target value Th-e0, while the rotation speed of the fan 46 is increased when the evaporation temperature of the hot-water supplying refrigerant circuit 6 is lower than the target value Th-e0. With this process, the evaporation temperature of the hot-water supplying refrigerant circuit 6 becomes the target value Th-e0.

According to the control described above, the evaporation temperature of the hot-water supplying refrigerant circuit 6 during the hot-water supplying operation and cooling operation is set to have the highest energy efficiency, whereby the energy efficiency of the air-conditioning hot-water supply system 100 can be kept high.

In the embodiment, the evaporation temperature of the hot-water supplying refrigerant circuit 6 is set as the control target value. However, the same effect can be obtained, even if the condensation temperature of the air temperature adjusting refrigerant circuit 5 is set as the control target value.

The same control can be executed even when the hot-water supplying operation and cooling operation in the <4> Operation mode No. 2-0b in FIG. 6 are executed, i.e., even when the heat source (heat absorption) for supplying hot water is smaller than the discharged heat in the cooling operation, and the surplus discharged heat in the cooling operation is absorbed by the air.

As illustrated in FIG. 6, in the intermediate heat exchanger 23, the refrigerant that flows through the refrigerant heat-transfer pipe 23a of the air temperature adjusting refrigerant circuit 5 and that is currently condensed releases heat to the refrigerant that flows through the refrigerant heat-transfer pipe 23b of the hot-water supplying refrigerant circuit 6 and that is currently evaporated, and further, the refrigerant that flows through the air heat exchanger 25 arranged parallel to the intermediate heat exchanger 23 and that is currently condensed releases heat to the outdoor air sent by the fan 46.

In this case, when the rotation speed of the fan 26 is reduced, the heat-transfer coefficient of the air in the air heat exchanger 25 decreases, so that the temperature difference between the air and the refrigerant increases. Therefore, the condensation temperature of the refrigerant flowing through the air heat exchanger 45 increases, whereby the condensation temperature of the refrigerant flowing through the refrigerant heat-transfer pipe 23a of the intermediate heat exchanger 23 arranged parallel to the air heat exchanger 25 also increases. On the other hand, when the rotation speed of the fan 26 increases, the heat-transfer coefficient of the air enhances in the air heat exchanger 25, so that the temperature difference between the air and the refrigerant decreases. Therefore, the condensation temperature of the refrigerant flowing through the air heat exchanger 25 decreases, whereby the condensation temperature of the refrigerant flowing through the refrigerant heat-transfer pipe 23a of the intermediate heat exchanger 23 arranged parallel to the air heat exchanger 25 also decreases. By utilizing this relationship, the control can be executed so that the evaporation temperature of the hot-water supplying refrigerant circuit 6, which is involved with the condensation temperature of the air temperature adjusting refrigerant circuit 5, becomes the target value Th-e0.

According to the control described above, the evaporation temperature of the hot-water supplying refrigerant circuit 6 during the hot-water supplying operation and cooling operation is set to have the highest energy efficiency, whereby the energy efficiency of the air-conditioning hot-water supply system 100 can be kept high.

The air-conditioning hot-water supply system and the heat pump unit according to the present invention are not limited to the configuration described in the above-mentioned embodiment. Various modifications are possible without departing from the scope of the present invention.

For example, the flow rate sensed by the flow rate sensor is used for calculating the cooling capacity and the hot-water supplying capacity in the above-mentioned embodiment. However, the flow rate may be estimated and calculated from the rotation speed of the pump, for example. In this case, the flow rate sensor is unnecessary, whereby cost can be reduced.

Although the heat medium circuit is connected to the heat storage tank connected to the solar heat collector in the above-mentioned embodiment, it may be connected in the ground or to the groundwater serving as the warm/cold heat source, for example.

In the embodiment described above, the heat medium circuit 7 includes the in-tank second heat exchanger 70 that absorbs heat from or releases heat to the water in the heat storage tank 60, and the warm heat and the cold heat are stored in the water in the heat storage tank 60. However, the invention is not limited thereto. The heat medium may be stored in the heat storage tank 60. The solar heat collecting heat medium circuit is not limited to the one storing the warm heat in the water in the heat storage tank. The heat medium may be stored in the heat storage tank.

In the embodiment described above, one heat storage tank is provided to store either one of the warm heat and the cold heat. However, the invention is not limited thereto. Plural heat storage tanks may be provided for storing warm heat and cold heat respectively.

The heat medium circuit and the solar heat collecting heat medium circuit may be connected to form a circulation path. This is particularly preferable for storing the warm heat.

The air temperature adjusting refrigerant circuit is not limited to the one for the air-conditioning such as the cooling operation and heating operation, so long as it can adjust the temperature of the air. For example, an operation of cooling a space in a refrigerator or a freezer is considered as the air cooling operation, while an operation of drying a bathroom or the like is considered as the air heating operation.

In the above-mentioned embodiment, the heat obtained by the air temperature adjusting refrigerant circuit is indirectly transmitted by the air temperature adjusting heat medium circuit so as to perform the air-conditioning. However, the invention is not limited thereto. The temperature of the air may directly be adjusted by using the utilization-side heat exchanger in the air temperature adjusting refrigerant circuit.

In the above-mentioned embodiment, the hot-water supplying refrigerant circuit 6 may directly heat water, so long as it generates hot water used for the supply of hot water. Another heat medium may be used to indirectly heat water.

The air-conditioning hot-water supply system and the heat pump unit according to the present invention do not have to include all operation modes illustrated in FIG. 2.

In the above-mentioned embodiment, the insufficient heat for the hot-water supply due to the shortage of the heat release during the cooling operation is made up by the heat in the air and the external heat such as the heat medium in the <3> Operation mode No. 2-0a and <5> Operation mode No. 2-1, but the invention is not limited thereto. The circulation amount of the refrigerant in the hot-water supplying refrigerant circuit may be adjusted according to the quantity of discharged heat during the cooling operation so as to supply hot water only with the discharged heat during the cooling operation.

In the above-mentioned embodiment, the surplus heat, not required for the hot-water supply, of the discharged heat during the cooling operation is discarded to the outside as the heat in the air, or absorbed by the heat medium in the <4> Operation mode No. 2-0b and <6> Operation mode No. 2-2, but the invention is not limited thereto. The circulation amount of the refrigerant in the hot-water supplying refrigerant circuit may be adjusted according to the quantity of discharged heat during the cooling operation so as to use all of the discharged heat during the cooling operation for the hot-water supply.

In the above-mentioned embodiment, the hot-water supplying circuit 9 performs the hot-water supplying operation by the hot-water supplying refrigerant circuit 6, wherein water is heated to generate hot water, but the invention is not limited thereto. The heat medium for the hot-water supply may be heated. In this case, for example, the considered configuration is that heated high-temperature heat medium is stored in the hot-water supply tank, and water is indirectly heated by using the high-temperature heat medium to discharge hot water.

REFERENCE SIGNS LIST

1 Heat pump unit
2 Indoor unit
3 Hot-water-supply/heat-storage tank unit
4 Solar heat collector
5 Air temperature adjusting refrigerant circuit
6 Hot-water supplying refrigerant circuit
7 Heat medium circuit
8a, 8b Air temperature adjusting heat medium circuit
9 Hot-water supplying circuit
10 Solar heat collecting heat medium circuit
11 Hot-water discharge path
21, 40 Compressor
23 Intermediate heat exchanger
25, 45 Air heat exchanger
28, 42 Utilization-side heat exchanger
50 Hot-water supply tank
60 Heat storage tank
100 Air-conditioning hot-water supply system

The invention claimed is:

1. An air-conditioning hot-water supply system comprising:
   an air temperature adjusting refrigerant circuit having a compressor and a utilization-side heat exchanger;
   a hot-water supplying refrigerant circuit having a compressor and a utilization-side heat exchanger; and
   an intermediate heat exchanger that performs a heat exchange between a refrigerant circulating in the air temperature adjusting refrigerant circuit and a refrigerant circulating in the hot-water supplying refrigerant circuit,
   wherein: the intermediate heat exchanger functions as a condenser for the air temperature adjusting refrigerant circuit, and as an evaporator for the hot-water supplying refrigerant circuit;
   when an air cooling operation by the air temperature adjusting refrigerant circuit and a hot-water supplying operation by the hot-water supplying refrigerant circuit are executed, the air temperature adjusting refrigerant circuit and the hot-water supplying refrigerant circuit are controlled such that a target evaporation temperature of the hot-water supplying refrigerating circuit or a target condensation temperature of the air temperature adjusting refrigerant circuit is attained, the target evaporation temperature or the target condensation temperature being set based upon an air cooling capacity and the evaporation temperature of the air temperature adjusting refrigerant circuit and a hot-water supplying capacity and the condensation temperature of the hot-water supplying refrigerant circuit; and
   the target evaporation temperature of the hot-water supplying refrigerant circuit or the target condensation temperature of the air temperature adjusting refrigerant circuit is set to be higher as a ratio of the hot-water supplying capacity to the air cooling capacity increases.

2. The air-conditioning hot-water supply system according to claim 1, wherein the target evaporation temperature of the hot-water supplying refrigerant circuit or the target condensation temperature of the air temperature adjusting refrigerant circuit is set to have the highest efficiency in the air cooling operation by the air temperature adjusting refrigerant circuit and in the hot-water supplying operation by the hot-water supplying refrigerant circuit.

3. The air-conditioning hot-water supply system according to claim 1,
   wherein: an air temperature adjusting air heat exchanger is provided to the air temperature adjusting refrigerant circuit, the air temperature adjusting air heat exchanger being arranged parallel to the intermediate heat exchanger and including a fan;
   a hot-water supplying air heat exchanger is provided to the hot-water supplying refrigerant circuit, the hot-water supplying air heat exchanger being arranged parallel to the intermediate heat exchanger and including a fan; and
   a rotation speed of the fan in the air temperature adjusting air heat exchanger and a rotation speed of the fan in the hot-water supplying air heat exchanger are controlled in order that the target evaporation temperature of the hot-water supplying refrigerant circuit or the target condensation temperature of the air temperature adjusting refrigerant circuit is attained, the target evaporation temperature or the target condensation temperature being set based upon the air cooling capacity and the evaporation temperature of the air temperature adjusting refrigerant circuit and the hot-water supplying capacity and the condensation temperature of the hot-water supplying refrigerant circuit.

4. An air-conditioning hot-water supply system comprising:
   an air temperature adjusting refrigerant circuit having a compressor and a utilization-side heat exchanger;
   a hot-water supplying refrigerant circuit having a compressor and a utilization-side heat exchanger;
   a heat medium circuit that allows a heat medium to circulate, the heat medium performing a heat exchange with refrigerants circulating in the air temperature adjusting refrigerant circuit and the hot-water supplying refrigerant circuit so as to store heat; and
   an intermediate heat exchanger that performs a heat exchange among the refrigerant circulating in the air temperature adjusting refrigerant circuit, the refrigerant circulating in the hot-water supplying refrigerant circuit, and the heat medium circulating in the heat medium circuit,
   wherein: the intermediate heat exchanger functions as a condenser for the air temperature adjusting refrigerant circuit, and as an evaporator for the hot-water supplying refrigerant circuit;
   when an air cooling operation by the air temperature adjusting refrigerant circuit and a hot-water supplying operation by the hot-water supplying refrigerant circuit are executed, the air temperature adjusting refrigerant circuit, the hot-water supplying refrigerant circuit, and the heat medium circuit are controlled such that a target evaporation temperature of the hot-water supplying refrigerant circuit or a target condensation temperature of the air-temperature adjusting refrigerant circuit is attained, the target evaporation temperature or the target condensation temperature being set based upon an air cooling capacity and the evaporation temperature of the air temperature adjusting refrigerant circuit and a hot-water supplying capacity and the condensation temperature of the hot-water supplying refrigerant circuit; and
   the target evaporation temperature of the hot-water supplying refrigerant circuit or the target condensation temperature of the air temperature adjusting refrigerant circuit is set to be higher as a ratio of the hot-water supplying capacity to the air cooling capacity increases.

5. The air-conditioning hot-water supply system according to claim 4, wherein the temperature of the heat medium of the heat medium circuit is controlled based upon the target evaporation temperature of the hot-water supplying refrigerant circuit or the target condensation temperature of the air temperature adjusting refrigerant circuit.

6. A heat pump unit comprising:
   an air temperature adjusting refrigerant circuit having a compressor and a utilization-side heat exchanger;
   a hot-water supplying refrigerant circuit having a compressor and a utilization-side heat exchanger; and
   an intermediate heat exchanger arranged between the air temperature adjusting refrigerant circuit and the hot-water supplying refrigerant circuit,
   wherein: the intermediate heat exchanger functions as a condenser for the air temperature adjusting refrigerant circuit, and as an evaporator for the hot-water supplying refrigerant circuit;
   when an air cooling operation by the air temperature adjusting refrigerant circuit and a hot-water supplying operation by the hot-water supplying refrigerant circuit are executed, the air temperature adjusting refrigerant circuit, and the hot-water supplying refrigerant circuit are controlled such that a target evaporation temperature of the hot-water supplying refrigerant circuit or a target condensation temperature of the air temperature adjusting refrigerant circuit is attained, the target evaporation temperature or the target condensation temperature being set based upon an air cooling capacity and the evaporation temperature of the air temperature adjusting refrigerant circuit and a hot-water supplying capacity and the condensation temperature of the hot-water supplying refrigerant circuit; and the target evaporation temperature of the hot-water supplying refrigerant circuit or the target condensation temperature of the air temperature adjusting refrigerant circuit is set to be higher as a ratio of the hot-water supplying capacity to the air cooling capacity increases.

* * * * *